(12) United States Patent
Olsen et al.

(10) Patent No.: US 12,258,718 B2
(45) Date of Patent: *Mar. 25, 2025

(54) PAVING MACHINE HAVING A CONTAINMENT BASIN

(71) Applicant: Idaho Asphalt Supply, Inc., Idaho Falls, ID (US)

(72) Inventors: Douglas Ray Olsen, Reno, NV (US); Huachun Zhai, Boise, ID (US); Devin Glenn Crighton, Queen Creek, AZ (US)

(73) Assignee: Idaho Asphalt Supply, Inc., Idaho Falls, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/642,169

(22) Filed: Apr. 22, 2024

(65) Prior Publication Data

US 2024/0279883 A1 Aug. 22, 2024

Related U.S. Application Data

(63) Continuation of application No. 18/362,392, filed on Jul. 31, 2023, now Pat. No. 11,993,896, which is a continuation of application No. 17/406,328, filed on Aug. 19, 2021, now Pat. No. 11,753,778.

(60) Provisional application No. 63/068,073, filed on Aug. 20, 2020.

(51) Int. Cl.
*E01C 19/18* (2006.01)
*E01C 19/17* (2006.01)

(52) U.S. Cl.
CPC .......... *E01C 19/178* (2013.01); *E01C 19/185* (2013.01)

(58) Field of Classification Search
CPC ..... E01C 19/178; E01C 19/185; E01C 19/187
See application file for complete search history.

(56) References Cited

U.S. PATENT DOCUMENTS

| | | | | |
|---|---|---|---|---|
| 1,997,248 A | * | 4/1935 | Densberger | E01C 23/082 172/612 |
| 2,175,511 A | * | 10/1939 | Wahlstrom | E01C 19/178 172/438 |
| 2,182,217 A | * | 12/1939 | Wahlstrom | E01C 19/178 404/101 |
| 4,863,310 A | | 9/1989 | Reed | |
| 5,120,155 A | | 6/1992 | Samspon | |
| 5,833,013 A | * | 11/1998 | Davis | A01B 45/02 172/612 |
| 5,980,153 A | | 11/1999 | Plemons et al. | |
| D514,597 S | * | 2/2006 | Lynch | D15/27 |
| 8,128,314 B2 | | 3/2012 | Buschmann et al. | |
| 8,408,839 B2 | | 4/2013 | Casters | |
| 9,179,588 B2 | * | 11/2015 | Davis | A01B 45/00 |
| 9,982,400 B1 | | 5/2018 | Davis et al. | |
| 10,017,907 B1 | | 7/2018 | Davis et al. | |
| 11,149,387 B2 | | 10/2021 | Kitano | |
| 11,753,778 B2 | * | 9/2023 | Olsen | E01C 19/178 404/101 |
| 11,993,896 B2 | * | 5/2024 | Olsen | E01C 19/185 |
| 2004/0148718 A1 | * | 8/2004 | Michel | A01G 20/43 15/78 |

(Continued)

*Primary Examiner* — Gary S Hartmann
(74) *Attorney, Agent, or Firm* — Ryan C. Stockett

(57) ABSTRACT

A paving machine which includes a containment basin. The containment basin has at least one brush therein to spread paving material onto a roadway surface.

20 Claims, 21 Drawing Sheets

(56) References Cited

U.S. PATENT DOCUMENTS

2021/0139248 A1    5/2021   Bergkamp et al.
2021/0230811 A1*   7/2021   Bergkamp .............. E01C 19/15

* cited by examiner

PAVING MACHINE HAVING A CONTAINMENT BASIN

CROSS-REFERENCE TO RELATED APPLICATIONS

This application is a continuation of application Ser. No. 18/362,392 that was filed on Jul. 31, 2023, which is a continuation of application Ser. No. 17/406,328 that was filed on Aug. 19, 2021, which claims the benefit of priority pursuant to 35 U.S.C. § 119(e) of U.S. provisional patent application No. 63/068,073, filed Aug. 20, 2020, all of which is hereby incorporated by reference.

BACKGROUND

Paving materials may come in many forms, such as liquids, solids, or slurries (e.g., mixtures of solids and liquids). Traditionally, different paving machines are needed to spread and finish paving materials of different forms. For example, when a paving material is a liquid (e.g., oil, an emulsion, or the like) one type of paving machine may be used to spread and finish the material layer on a roadway. When a paving material is a slurry, paste, semi-liquid, non-Newtonian fluid, or the like, another type of paving machine may be used. Paving machines of either type may trail behind a vehicle that dispenses the paving material.

Additionally, traditional paving machines may have a fixed width or have a limited width variability, such that traditional machines are not able to be adjusted for paving applications of differing widths or asymmetric paving (e.g., off-center paving). For example, when paving an edge of a roadway, a traditional paving machine may be deployed over the unpaved shoulder of the road, applying paving material where it is not desired, or damaging the machine as it contacts vegetation, rocks, or debris along the roadway.

The shortcomings of traditional paving machines may result in additional costs to users of such paving machines, such as municipalities, state or federal road departments, private paving companies, or others. For example, users may need to buy and maintain multiple machines for different applications, and may have to haul multiple machines to job sites.

BRIEF SUMMARY

An adjustable paving machine is disclosed. In some embodiments, the adjustable paving machine includes a first frame portion including a first plurality of walls. The adjustable paving machine may include a variably expandable portion including a second plurality of walls forming a movable frame operably coupled to the first frame portion and configured to be laterally movable relative to the first frame portion. At least one spreading element is affixed to at least one of the first frame portion or the variably expandable portion and configured to spread a paving material on a paving surface.

In some embodiments, the adjustable paving machine includes an actuator coupled to the movable frame and configured to move the variably expandable portion relative to the first frame portion. The actuator may be a rotary actuator. In some implementations, the rotary actuator may be a hydraulic motor, a pneumatic motor, or an electric motor. A first rotating guide member may be coupled to the rotary actuator. A second rotating guide member may be in rotational contact with the first rotating guide member and coupled to a first linear actuator. The rotary actuator may be configured to transmit rotational motion to the first linear actuator via the first and second rotating guide members. The first linear actuator may be operatively coupled to a first thrust member coupled to the first frame portion. The rotational motion of the first linear actuator may cause the first thrust member to generate a first thrust to move the movable frame laterally relative to the first frame portion.

In some embodiments, the adjustable paving machine includes a third rotating guide member coupled to an end of the first linear actuator opposite an end of the first linear actuator coupled to the second rotating guide member. A flexible element may be in rotational contact with the third rotating guide member and configured to transmit rotational motion of the third rotating guide member to a fourth rotating guide member. A second linear actuator may be coupled to the fourth rotating guide member. The second linear actuator may be operatively coupled to a second thrust member coupled to the first frame portion. The rotational motion of the second linear actuator may cause the second thrust member to generate a second thrust to move the movable frame laterally relative to the first frame portion.

In some embodiments, the flexible element synchronizes the lateral motion, relative to the first frame portion, of a portion of the movable frame proximate the first thrust member with a portion of the movable frame proximate the second thrust member.

In some embodiments, the first frame portion and the movable frame form a containment basin operative to confine the paving material. A size of the containment basin may change as the movable frame moves laterally with respect to the first frame portion. The movable frame portion may include a plurality of sealing elements, at least one of the first frame portion and the movable frame may include a finishing element. The plurality of sealing elements and the finishing element may form the containment basin.

In some embodiments, the adjustable paving machine includes a second frame portion coupled to the first frame portion; and a discretely expandable portion. The discretely expandable portion may include a primary frame pivotally coupled to the second frame portion. The primary frame may include a first spreading element support configured to support at least one spreading element. The discretely expandable portion may include a secondary frame pivotally coupled to the primary frame. The secondary frame may include a second spreading element support configured to support at least one other spreading element. The primary frame or the secondary frame may include a finishing element.

In some embodiments, the adjustable paving machine includes an adjustable shoe movable in a vertical direction and configured to move the adjustable paving machine relative to the paving surface.

In some embodiments, the adjustable paving machine includes a spreading element support configured to releasably secure at least one spreading element. The spreading element support may include an internal wall that forms a channel. The channel may be configured to releasably receive a body portion of at least one spreading element. In some embodiments, a spreading element may be a broom.

In some embodiments, a system may include an adjustable paving machine and a paving material. The paving material may be one of an oil, an emulsion, or a slurry.

In some embodiments, the adjustable paving machine includes a frame portion including a pair of thrust members, a variably expandable portion operatively associated with the frame portion, and a spreading element capable of spreading paving material on a paving surface. The variably expandable portion may include a movable frame and a pair of linear actuators. The linear actuators may be coupled to the movable frame and operatively associated with a respective thrust member of the pair of thrust members, and may be capable of laterally expanding the movable frame relative to the frame portion.

DETAILED DESCRIPTION

This disclosure relates to adjustable paving machines. As used herein, a paving machine is any device suitable to apply a paving material on a paving surface. A paving machine may be self-powered, such as a vehicle, or it may be towed or pulled by a vehicle. In many examples, a paving machine (e.g., a paving screed or slurry box) may be towed behind a vehicle that supplies the paving material to the paving machine or to the paving surface in front of a paving machine. The paving machine may spread the paving material on the paving surface to form a substantially uniform layer of the paving material on the paving surface. As used herein, an adjustable paving machine is any paving machine suitable for use with multiple types of paving materials and/or having an adjustable paving width.

In some embodiments, an adjustable paving machine of the present disclosure may be suitable for use with multiple forms of paving materials. As used herein, a paving material is any material suitable to apply to a paving surface to create a substantially smooth, uniform surface suitable to support and/or enable the transportation of vehicles, goods, livestock, bicycles, people, or the like. In many examples, paving surfaces may be roads, paths, parking lots, decks, storage areas, or the like. Some examples of paving materials include, but are not limited to, asphalt, bitumen, oil (e.g., petroleum oil, plant-based oil, animal-based oil, recycled oil), liquid polymer/latex, rejuvenation products (e.g., a product suitable to replenish an asphalt binder in a paving surface that has been lost due to weathering, age, oxidation, etc.), an asphalt emulsion, a cut back (e.g., a mixture of asphalt and a solvent), aggregate (e.g., gravel, stone chips, sand, etc.), asphalt cements (e.g., regular asphalt, polymer modified asphalt, asphalt rubber, terminal blended crumb rubber modified asphalt, and the like), other asphalt paving materials (e.g., cold mix asphalt, warm mix asphalt, hot mix asphalt, scrub seals, fog seals, slurry seals, and the like), combinations of these materials, or other suitable materials. A paving material may be in the form of a solid (e.g., gravel), a liquid (e.g., oil), a slurry (e.g., a mixture of water, asphalt emulsion, and aggregate), a paste, a semi-liquid, a non-Newtonian fluid, or the like. In some embodiments, an adjustable paving machine of the present disclosure may be adjustable in width such as to suit different paving applications or materials. The adjustable paving machine may also be described as a scrub box.

Figure 11:
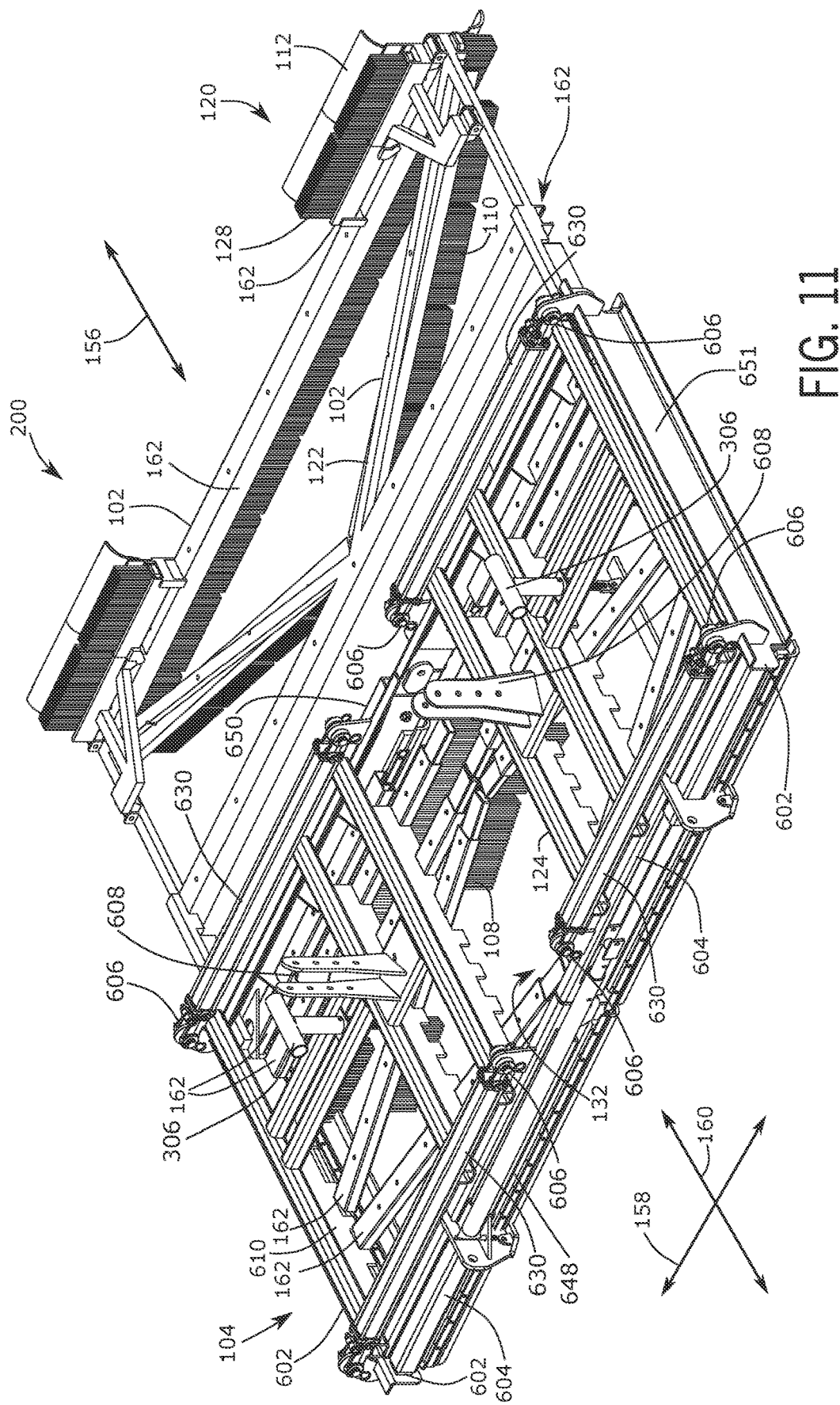
FIG. 11 is a top, front isometric view of an example of a paving machine in a first configuration.
Figure 12:
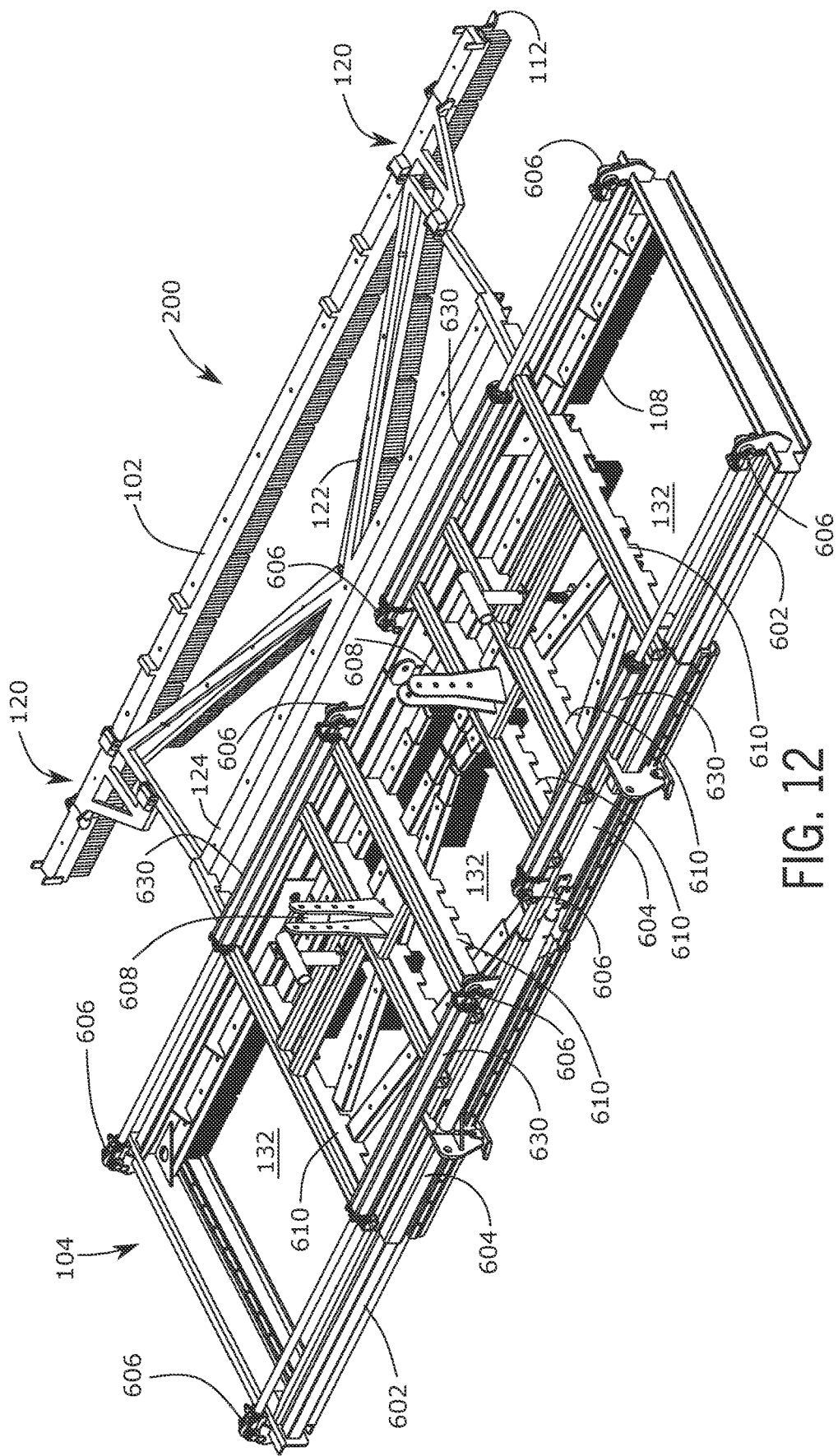
FIG. 12 is a top, front isometric view of an example of the paving machine of FIG. 11 in a second configuration.

Discussion of the features of the paving machines disclosed herein may benefit from reference to certain directions relative to the machine. "Longitudinally" and variants thereof generally refer to a direction aligned with the direction of travel of the paving machine when in use, for example when towed behind a vehicle that supplies a paving material to the adjustable paving machine 100, such as shown by arrow 156 in FIGS. 1 & 11. "Fore" or "Aft" generally refer to locations closer or further, respectively, from the portion of the adjustable paving machine 100 adapted for coupling to a tow vehicle (e.g., the traction elements 118 shown in FIG. 1). "Vertically" and variants thereof generally refer to directions aligned with a weight vector of the adjustable paving machine 100 when deployed for use, such as shown by arrow 160 in FIG. 1. "Laterally" and variants thereof generally refer to a direction substantially perpendicular to a longitudinal direction (e.g., left or right), such as shown by arrow 158 in FIG. 1. These terms are solely meant to be illustrative and in no way limiting. The terms first and second, when referring to the sides of the adjustable paving machine 100, may be interchanged with "left" and "right," respectively, for simplicity and clarity of the description that follows, noting, however, that this is not intended as limiting given that the designation of sides of the machine as either left or right is arbitrary and purely illustrative.

With reference to FIG. 1-FIG. 4, an example of an adjustable paving machine 100 is shown. The adjustable paving machine 100 includes a first frame portion 124. The adjustable paving machine 100 may include a second frame portion 102 coupled to the first frame portion 124. The first frame portion 124 may be coupled to a vehicle configured to pull or tow the adjustable paving machine 100. The second frame portion 102 may follow and be pulled by the first frame portion 124 when the adjustable paving machine 100 is in use. The first and second frame portions 124, 102 may be releasably coupled to one another. For example, the first and second frame portions 124, 102 maybe coupled by suitable fasteners such as, bolts, pins, or the like. In some examples, the first frame portion 124 may be non-releasably coupled to the second frame portion 102. For example, the first frame portion 124 and the second frame portion 102 may be coupled by rivets, welding, adhesive, brazing, or the like. In some examples, only one frame portion 102 or 124 may be used. The frame portions 102, 124 support other elements and features of the adjustable paving machine 100. The frame portions 102, 124 provide strength and structural rigidity to the adjustable paving machine 100, such as to withstand the rigors of the paving environment including uneven surfaces, the weight of people or machine being placed atop the adjustable paving machine 100, impacts with objects, transport to and from a paving site, and the like. The first frame portion 124 and/or second frame portion 102 may be constructed of any suitably strong material. In many implementations, the frame portions 102, 124 may be constructed of metals such as steel, stainless steel, aluminum, brass, bronze, or alloys thereof. In some implementations, the frame portions 102, 124 may be constructed from plastics or reinforced plastics (e.g., glass, carbon, or aramid fiber reinforced plastics). In some implementations, one or more portions of the first frame portion 124 and/or second frame portion 102 may be constructed from one material while other portions are constructed from other materials. In some implementations, the first frame portion 124 and the second frame portion 102 may be constructed from different materials. For example, the first frame portion 124 may be constructed from steel while the second frame portion 102 may be constructed from aluminum.

Figure 1:
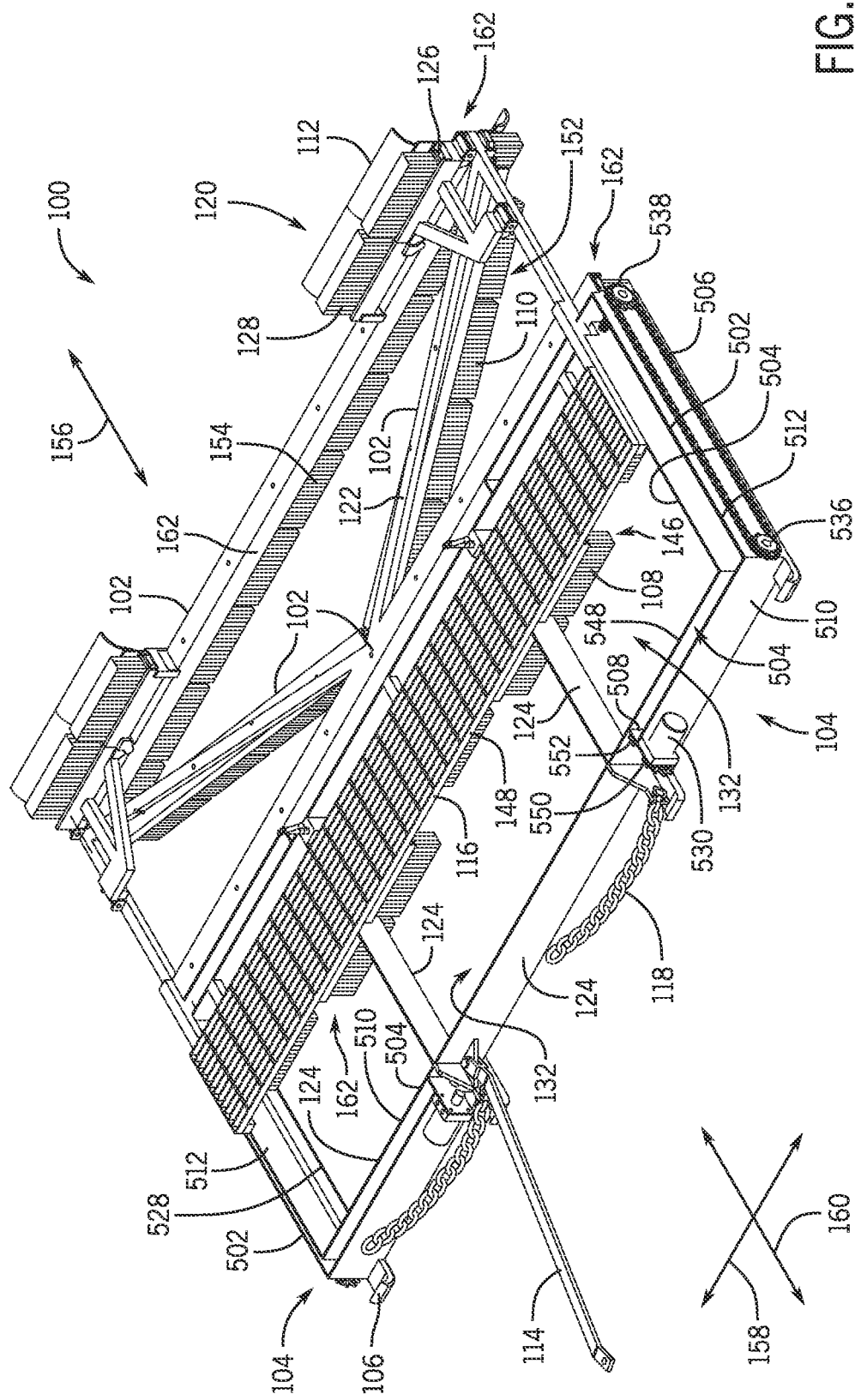
FIG. 1 is a top, front isometric view of an example of a paving machine in a first configuration.
Figure 2:
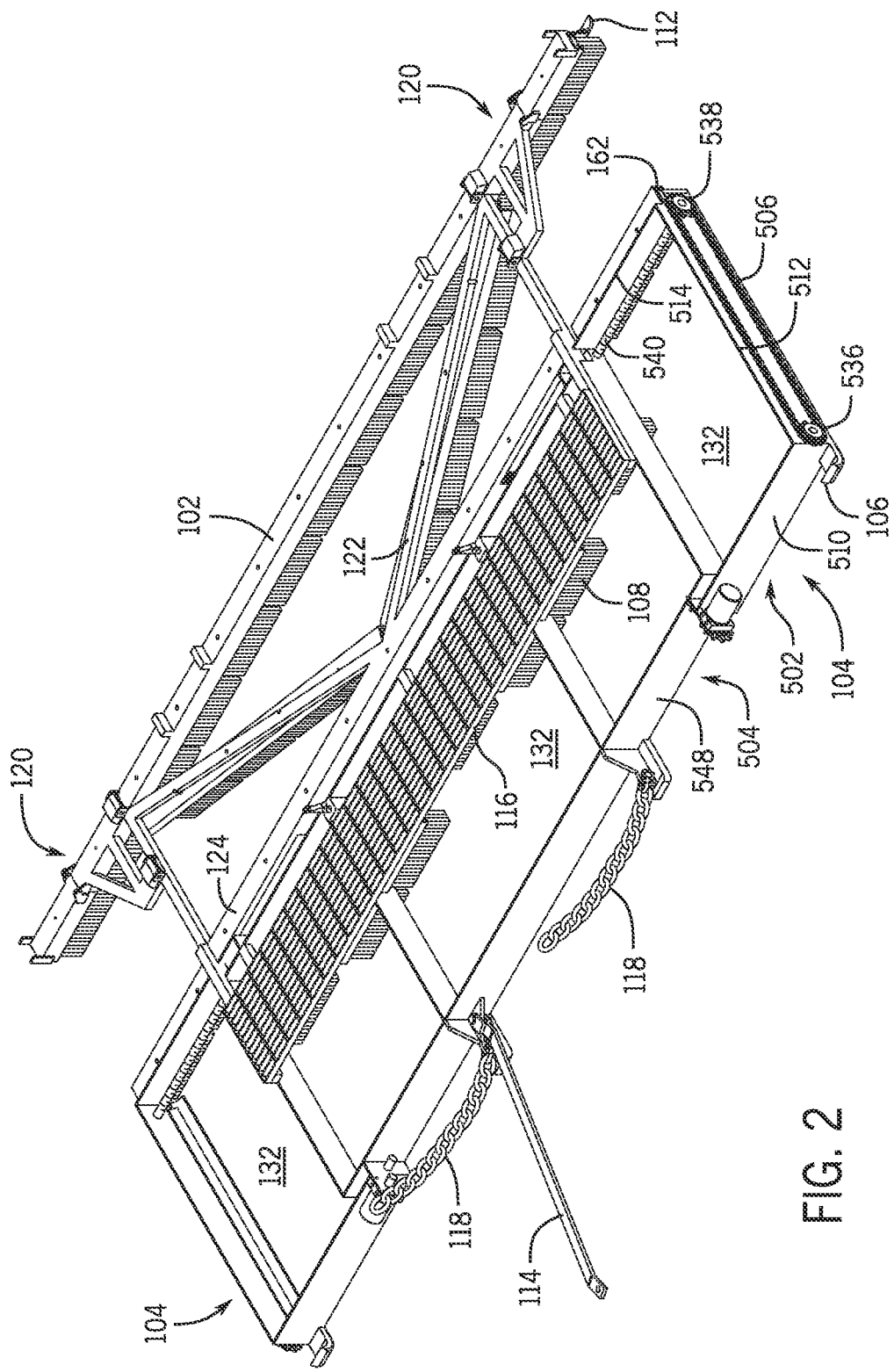
FIG. 2 is a top, front isometric view of an example of the paving machine of FIG. 1 in a second configuration.

The adjustable paving machine 100 may have one or more variably expandable portions 104. A variably expandable portion 104 may expand laterally to any position between a retracted position (as shown in FIG. 1) and an expanded position (as shown in FIG. 2). In many embodiments, the variably expandable portion 104 may be continuously positionable (such as substantially without discrete positions). In some embodiments, the variably expandable portion 104 may have discrete positions between the fully expanded and fully retracted configurations. In some implementations, an adjustable paving machine 100 may include a leading variably expandable portion and a trailing variably expandable portion 104 positioned behind the leading variably expandable portion with respect to a direction of travel of the paving machine over a paving surface. The leading and trailing variably expandable portions may be independently operable with respect to one another. In some implementations, a variably expandable portion may include a rail or telescoping section.

In some embodiments, the variably expandable portion 104 can be adjusted such that the adjustable paving machine 100 can have a wider or narrower width as may be suitable for different paving applications. As shown in FIG. 1, the adjustable paving machine 100 includes two variably expandable portions 104 disposed on each of the left and right side of the adjustable paving machine 100. In the configuration of FIG. 1, the variably expandable portions 104 are in a retracted position. In the configuration of FIG. 2, the variably expandable portions 104 are in an extended position. The variably expandable portions 104 may be independently operable, such that each variably expandable portion 104 may be adjusted independently of the other variably expandable portion 104, as shown for example in FIG. 3. In some implementations, a width (e.g., as measured along the lateral direction indicated by arrow 158 in FIG. 1) of the adjustable paving machine 100 may be variable between a retracted position (e.g., as shown in FIG. 1) and an extended position (e.g., as shown in FIG. 2), such that in the retracted position the adjustable paving machine 100 has a width of about 8 feet and in the extended position has a width of about 14 feet. In other implementations, the width of the adjustable paving machine may be variable between about 9 feet in a retracted position and about 14 feet in an extended position. In some implementations, the width of the adjustable paving machine 100 may be variable between a width of one or more of 2, 3, 4, 5, 6, 7, 8, 9, or 10 feet in a retracted position and one or more of 3, 4, 5, 6, 7, 8, 9, 10, 11, 12, 13, 14, 15, 16, 17, 18, 19, 20 or more feet in the extended position where the extended position is wider than a respective retracted position.

Figure 5:
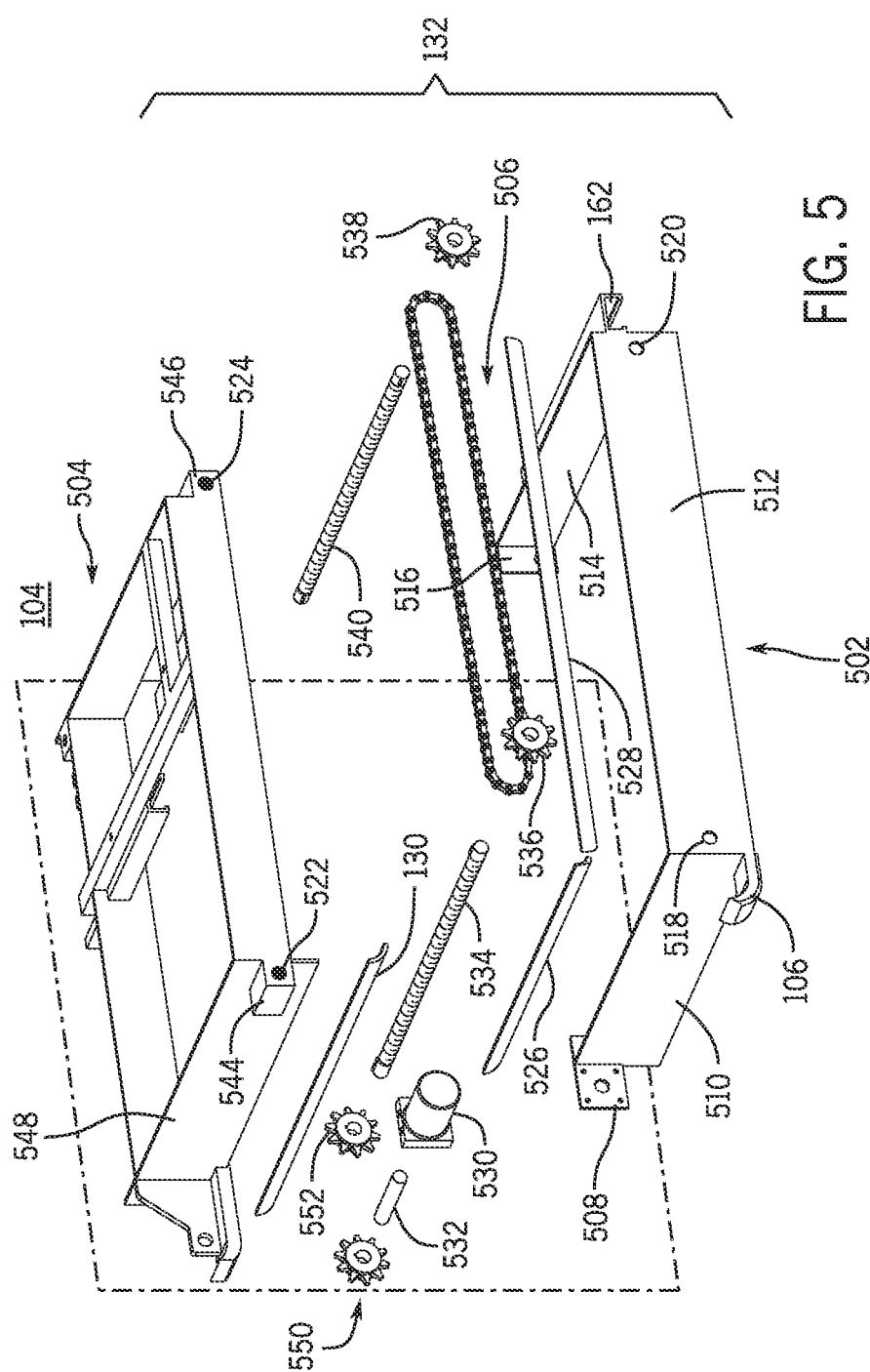
FIG. 5 is an exploded view of a portion of the paving machine of FIG. 1.

FIG. 5 illustrates details of an example of a variably expandable portion 104. The variably expandable portion 104 shown is an example associated with a left side of the adjustable paving machine 100. A variably expandable portion 104 associated with the other, or right, side of the adjustable paving machine 100 may be substantially the same as the variably expandable portion 104 shown and described, but mirrored about a longitudinal midplane of the adjustable paving machine 100, description of which is not provided separately, for brevity.

Figure 4:
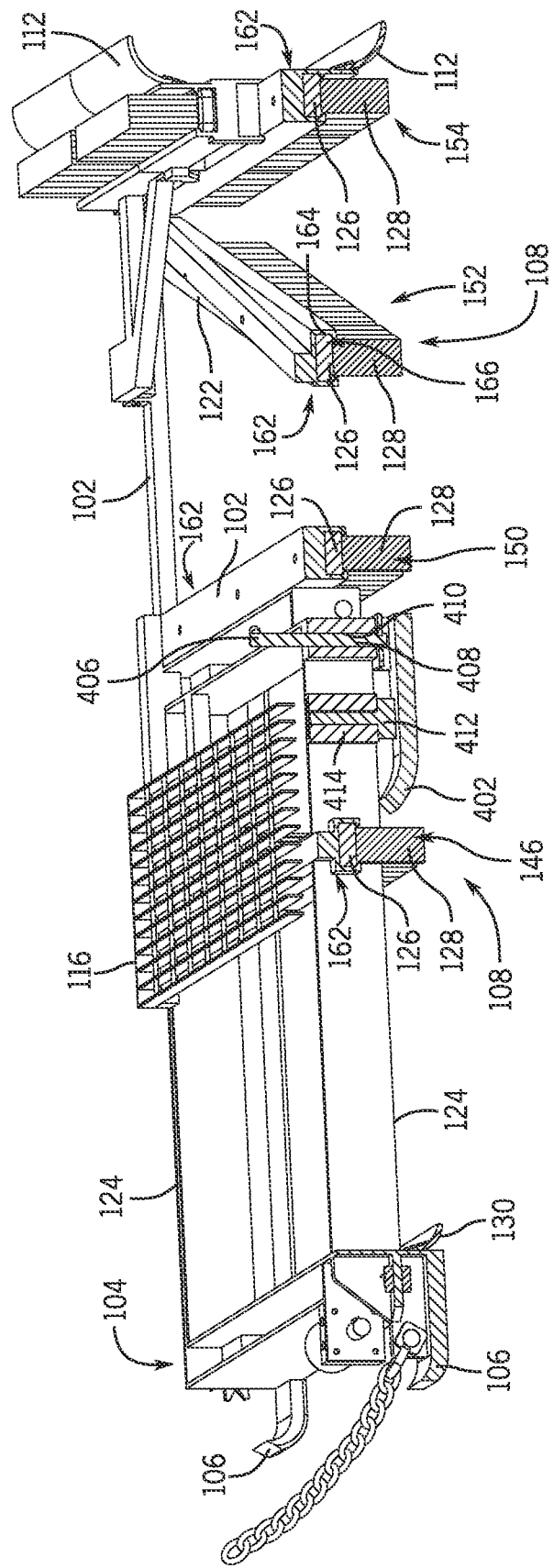
FIG. 4 is a cross section of the paving machine of FIG. 1 taken along section line 4-4 of FIG. 3.

The adjustable paving machine 100 may include one or more spreading elements 108. A spreading element 108 may be any device or structure adapted to disperse or spread a paving material on a road surface or drive paving material into a road surface, such as cracks in the surface. In many implementations, a spreading element may be a broom, brush, auger, chute, a strike-off element (e.g., a flexible, rigid, or semi-rigid elastomeric element), bar, plastic, roller, chain, mat, screen, burlap, carpet, piece of fabric, hose, board, or other suitable structure. The adjustable paving machine 100 may include spreading elements 108 arranged in one or more successive rows. Multiple rows may help distribute the paving material evenly on the road surface. For example, the adjustable paving machine 100 shown may include five successive rows of spreading elements. As best seen in FIG. 1 and FIG. 4, the adjustable paving machine 100 includes a first spreading element row 146, a second spreading element row 148, a third spreading element row 150, a fourth spreading element row 152, and a fifth spreading element row 154. An adjustable paving machine 100 may have more or fewer rows of spreading elements 108 as appropriate for a given paving material or application. One or more of the spreading element rows may include a spreading element 108 that is an angled spreading element 110, such that the row is at an angle with respect to either the longitudinal or lateral directions of the adjustable paving machine 100. For example, the fourth spreading element row 152 in the adjustable paving machine 100 is angled with respect to the longitudinal or lateral directions of the adjustable paving machine 100. The fourth spreading element row 152 includes first and second portions such as a strut 122 substantially mirrored about a midline of the adjustable paving machine 100 such that the fourth spreading element row 152 forms a chevron shape. Other angled spreading element rows may have more or fewer portions at different angles. In other examples, other spreading element rows may be angled. In some examples, no spreading element rows may be angled.

A spreading element 108 may have a body portion 126 and a spreading portion 128 (see FIG. 4). The body portion 126 may be adapted to be received in or attach to a portion of the adjustable paving machine 100. The body portion 126 may support the spreading portion 128.

The spreading portion 128 may include bristles, fingers, or similar spreading structures suitable to spread a paving material. Bristles may be positioned individually in the spreading portion 128, or may be disposed in groups of bristles. Bristles may be made of any suitable stiffness or flexibility. For example, a bristle may be relatively stiff such as when a paving material is relatively viscous or dense, such as a slurry. In some examples, a bristle may be relatively flexible such as when a paving material is relatively free flowing, such as an oil. Similarly, bristle density (e.g., a packing density of a number of bristles per unit area such as bristles per square inch) may be varied as desired. For example, a more dense bristle arrangement may be used with less viscous or free-flowing paving materials, or where a finer finish is desired. A less dense bristle arrangement may be used such as when the paving material is viscous or dense such as with a slurry or asphalt. In some examples, bristle density, length, thickness, size, stiffness, or other characteristics may vary within a given spreading element 108. For example, the spreading portion 128 may have a forward portion with a low density of stiff bristles and an aft portion with a greater density of more flexible bristles.

The spreading portion 128 may be made of any suitable material for a given application. For example when a relatively stiff bristle is desired, a bristle may be made of metal such as steel, aluminum, or another metal. In another example, when a relatively flexible bristle is desired, a bristle may be made from plastic, rubber, wood, or similarly compliant materials. Bristles may be made of combinations of materials, such as a plastic coated metal or the like. The thickness (e.g., diameter) and/or length of a bristle may be varied as well as the material to achieve desired spreading and finishing properties.

As best shown in FIG. 4, one or more of the spreading elements 108 of the adjustable paving machine 100 may be removably attached to the adjustable paving machine 100. For example, a spreading element 108 may be removed from the adjustable paving machine 100. A replacement spreading element 108 may be attached to the adjustable paving machine 100. A spreading element 108 may be attached to the adjustable paving machine 100 via a spreading element support 162. Any suitable part of the adjustable paving machine 100 may include, or have attached thereto, a spreading element support 162. As shown for example in FIG. 4, a spreading element support 162 may be attached to, or formed with, the strut 122, the first frame portion 124, or the second frame portion 102. As shown for example in FIG. 2, spreading element support 162 may be attached to, or formed with, a variably expandable portion 104. As shown for example in FIGS. 8A-8C, a spreading element support 162 may be attached to, or formed with, a discretely expandable portion 120. The spreading element support 162 may be any suitable structure to releasably hold a spreading element 108. In many implementations, the spreading element support 162 may include an internal wall 164 that forms a channel 166. The channel 166 may be adapted to releasably receive the body portion 126 of a spreading element 108. For example, the channel 166 may be open at one or more ends such that one or more spreading elements 108 may be slid into the channel 166 with the body portion 126 at least partially surrounded by, and/or the spreading portion 128 supported by, the internal wall 164 of the spreading element support 162. A spreading element 108 may be secured in the channel 166 by a pin, screw, bolt, or other fastener. The spreading element support 162 may provide certain advantages, such as enabling fast and easy replacement of worn, clogged, or dirty spreading elements 108. The spreading element support 162 may enable adaptation of the adjustable paving machine 100 to changing road, paving, or paving material conditions by enabling certain spreading elements 108 to be replaced with other spreading elements 108. For example, stiff spreading elements 108 may be replaced with relatively more flexible spreading elements 108, and the like. Any number of different types of spreading elements 108 may be placed within a spreading element support 162. For example, stiffer spreading elements 108 may be loaded into the spreading element support 162 near the midline of the adjustable paving machine 100, while relatively less stiff spreading elements may be loaded toward the edges of the adjustable paving machine 100.

The adjustable paving machine 100 may include a deck 116. The deck 116 may be any suitable structure or material to support the weight of one or more users. For example, the deck 116 may be formed of a grate, plate, or similar structure. The deck 116 may be constructed of a meatal such as steel, aluminum, or the like. The deck 116 may be removable from the adjustable paving machine 100.

The adjustable paving machine 100 may include at least one traction element 118 suitable to couple the adjustable paving machine 100 to a vehicle. In some implementations, the traction element 118 is suitable to tow the adjustable paving machine 100 behind a vehicle, such as a truck that supplies paving material to the adjustable paving machine 100 or to the road surface in front of the adjustable paving machine 100. In the example shown, the adjustable paving machine 100 includes two traction elements 118. For example, the traction element 118 may be a chain, strap, bar, tongue, hitch, or the like. A control element 114 is provided, which may help control a lateral position of the adjustable paving machine 100 relative to a tow vehicle or to a paving surface.

In some implementations, a lift mechanism may be provided to raise or lower the adjustable paving machine 100. For example, as discussed, an adjustable paving machine 100 may be towed behind a vehicle (e.g., an asphalt distributor). The vehicle and/or the adjustable paving machine 100 may include a lift mechanism including an arm, cantilever, pulley, and/or traction element (e.g., a chain or strap) operative to raise or lower the adjustable paving machine 100.

In some implementations, a dolly mechanism may be provided to enable the adjustable paving machine 100 to move over a paving surface. For example, a dolly mechanism may include one or more axles extending laterally through, or attached to, at least a portion of the adjustable paving machine 100. The axle may have one or more rolling elements such as a wheel or caster rotatably mounted thereon and operative to allow the adjustable paving machine to roll along a paving surface.

The lift mechanism and/or dolly mechanism may adjust a height of the adjustable paving machine 100 with respect to the paving surface. In some implementations, a lift mechanism and/or dolly mechanism may be operated automatically. It may be advantageous to raise or lower the adjustable paving machine 100 relative to the paving surface during operation based on the paving material being applied, the condition of the paving surface, the speed at which the adjustable paving machine 100 moves along the paving surface, or other factors. The lift mechanism and/or dolly mechanism may be retractable, removable, or otherwise configurable to a position such that one or more portions (e.g., the spreading elements 108, shoes 106, and/or finishing elements 112, 130) of the adjustable paving machine 100 is in contact with the paving surface. The lift mechanism and/or dolly mechanism may be selectively attachable to the adjustable paving machine 100. For example, when the adjustable paving machine 100 is used with a first type of paving material and/or a first vehicle (e.g., an asphalt distributor) the adjustable paving machine 100 may be configured with a suitable lift mechanism or dolly mechanism compatible with the paving material and/or vehicle. When the adjustable paving machine 100 is used with a second type of paving material and/or vehicle, the adjustable paving machine 100 may be configured with another type of suitable lift mechanism or dolly mechanism. A lift mechanism and/or dolly mechanism may be selectively attachable to the adjustable paving machine 100 by any suitable device or structure, such as a pin, bolt, nut, shaft, screw, rivet, spline, key, or the like.

In some implementations, a lift mechanism and/or dolly mechanism may be deployable to transport the adjustable paving machine 100 to a job site. For example, the lift mechanism and/or dolly mechanism may be configurable such that the spreading elements 108, shoes 106, finishing elements 112, 130, and/or other portions are not in contact with the ground. For example, when an adjustable paving machine 100 is transported from a storage location to a paving job location, it may not be desirable to have the adjustable paving machine 100 in contact with the ground due to wear, slower vehicle speeds, or other issues, and the lift mechanism or dolly mechanism may lift the adjustable paving machine 100 off the ground behind the vehicle to case transport to a paving job site.

One or more shoes 106 may be provided at a lower portion of the adjustable paving machine 100. A shoe may be any device or structure that aids the adjustable paving machine 100 to move over a paving surface, such as by reducing a coefficient of friction (either static or dynamic) between the paving machine 100 and the paving surface. The shoe 106 may help the adjustable paving machine 100 slide along a surface more easily than in the absence of shoe 106. The shoe 106 may have a form of a ski with a raised forward portion and a horizontally disposed body portion. The shoe 106 may be provided on any portion of the adjustable paving machine 100 such as the first frame portion 124, the second frame portion 102, or a variably expandable portion 104. In some implementations, the shoe may be a dolly, wheel, caster, roller, slider, drum, disk, skid, etc.

As shown in FIG. 4, the adjustable paving machine 100 may include one or more adjustable shoes 402. Any of the shoes 106 may be an adjustable shoe 402. An adjustable shoe 402 is shown associated with the first frame portion 124, however an adjustable shoe 402 may be associated with other portions of the adjustable paving machine 100 such as the second frame portion 102 or a variably expandable portion 104. The adjustable shoe 402 may support the adjustable paving machine 100 on a paving surface. The adjustable shoe 402 may be movable in a vertical direction such as by a shoe position adjustment mechanism 406. The shoe position adjustment mechanism 406 may include a shaft 410 operably couplable to a receptacle 408. The shaft 410 may be coupled to the adjustable shoe 402. For example, the shaft 410 may have threads on an outer surface. The receptacle 408 may form an aperture including threads that cooperate with the threads of the shaft 410. As the shaft 410 is rotated relative to the aperture, the respective threads cooperate to raise or lower the shaft 410 and thus the adjustable shoe 402 relative to the adjustable paving machine 100. In other examples, the shaft 410 may include apertures or detents such that the shaft 410 may be selectively positioned relative to a portion of the adjustable paving machine 100 such as the first frame portion 124 in predetermined increments such as by a pin or the like.

The adjustable shoe 402 may be associated with a stabilizer 412. The stabilizer 412 may be received in a portion of the adjustable paving machine 100 such as a stabilizer retainer 414, which may be associated with the first frame portion 124 or other portion of the adjustable paving machine 100. The stabilizer 412 may transfer stress to another portion of the adjustable paving machine 100. Such stress may be shear stress related to friction of the adjustable shoe 402 as the adjustable paving machine 100 moves over the paving surface. By transferring stress to the first frame portion 124, stress in the shoe position adjustment mechanism 406 may be reduced to enable easy adjustment of the adjustable shoe 402. Additionally or alternatively, transferring stress may help reduce wear or damage to the adjustable show 402 or the shoe position adjustment mechanism 406.

The adjustable shoe 402, similar to the optional lift mechanism or dolly mechanism, may be configured to move the adjustable paving machine 100 relative to the paving surface. For example, one or more adjustable shoes 402 may be raised or lowered to change the contact of the spreading elements 108 with the paving surface. For example, if a paving material spreads relatively easily (e.g., oil) the adjustable shoes 402 may be moved to a relatively high position, which may cause the spreading elements 108 to be raised relative to the paving surface, thus reducing contact of the spreading elements 108 with the paving surface. Likewise, when a paving material is relatively more difficult to spread, such as a slurry, the adjustable shoes 402 may be lowered relative to the adjustable paving machine 100, thereby increasing contact of the spreading elements 108 with the paving surface.

The adjustable paving machine 100 may include one or more finishing elements 112, also known as a strike-off element. A finishing element 112 may be any suitable element that confines or contains paving material or applies a final texture or surface to a layer of the paving material as it passes rearward from the aft end of the adjustable paving machine 100. A finishing element 112 may be disposed in any location on the adjustable paving machine 100. In many implementations, a finishing element 112 may be placed behind a spreading element 108. In some implementations, a finishing element 112 may be the most rearward element of the adjustable paving machine 100, for example, rearward of the fifth spreading element row 154, such that it is the last element to contact the paving material, thus providing a finish to the material. In some implementations, a finishing element 112 may be disposed near a forward section of the containment basin 132, such as the forward finishing element 130 (see FIG. 4). In some implementations, a variably expandable portion 104 may include a finishing element 112.

A finishing element 112 may be constructed of any suitable material that can confine or finish the layer of paving material. In many implementations, a finishing element may be constructed of an elastomer such as rubber (natural or synthetic). In other implementations, the finishing element may be constructed of a fiber such as cotton, wool, jute, hemp, or synthetics like nylon or polyester. In some implementations, the finishing element may be constructed of metal such as steel, aluminum, or the like. A finishing element may be constructed of combinations of these materials, such as a fiber-reinforced rubber.

In other implementations, the finishing element 112 may be in the form of a smooth sheet or strip of any of the preceding materials. In some implementations, the finishing element 112 may be a fabric (woven or non-woven) such as made from fibers. In some implementations, a finishing element 112 may be a screen such as a metal screen. The finishing element 112 may include one or more chains or similar structures to provide a desired surface finish to the paving material.

In some implementations, a finishing element 112 may be used in place of a spreading element 108 and vice versa. For example, a finishing element 112 may have a body portion adapted to be received in a spreading element support 162, such as in a channel 166. Such configurations may provide additional flexibility to meet changing paving conditions, material properties, and the like.

As discussed in more detail with respect to FIG. 5, the first frame portion 124 may form a containment basin 132. The containment basin 132 may be operative to receive paving materials, such as slurries, and confine the materials for subsequent spreading and finishing by the adjustable paving machine 100.

The adjustable paving machine 100 may include a stationary frame 504 including one or more walls 548. In the example shown in FIG. 5, the stationary frame 504 is a portion of the first frame portion 124. Other suitable stationary frames 504 may be provided. The wall 548 may include a linear actuator thrust member 544 and a linear actuator thrust member 546. Either or both of the linear actuator thrust member 544 or 546 may include internal walls that form respective actuator active aperture 522 or 524.

The variably expandable portion 104 may include a movable frame 502. The movable frame 502 may include one or more walls, such as a leading lateral wall 510, a side wall 512, and a trailing lateral wall 514. A shoe 106 and/or an adjustable shoe 402 may be associated with a portion of the movable frame 502. A wall of the movable frame 502 may form an actuator clearance aperture 518 and an actuator clearance aperture 520. A spreading element support 162 may be associated with a portion of the movable frame 502 such as the trailing lateral wall 514. An actuator mount 508 may be associated with the movable frame 502 such as the leading lateral wall 510. The actuator mount 508 may protrude from a portion of the movable frame 502, such as the leading lateral wall 510, in a longitudinal direction. An actuator mount 516 may be associated with the movable frame 502. The actuator mount 516 may protrude from a portion of the movable frame 502, such as the trailing lateral wall 514 in a longitudinal direction. Either of the actuator mount 508 and/or the actuator mount 516 may be associated with either of the leading lateral wall 510 and/or the trailing lateral wall 514.

The stationary frame 504 and the movable frame 502 and associated components may form the containment basin 132. The containment basin 132 may corral or contain a paving material in an area such that it may be spread in a designated area and a controlled manner such as by the spreading elements 108 and/or finishing elements 112. For example, the stationary frame 504 and/or the movable frame 502 may include one or more sealing elements such as the leading sealing element 526 or the side sealing element 528. A sealing element may be any structure suitable to seal a gap between the variably expandable portion 104 and the paving surface, such as a gap formed by a shoe 106 and/or an adjustable shoe 402. The sealing elements 526 and 528 may be made of a pliant material such as an elastomer (e.g., natural or synthetic rubber) that can flex with variations in the paving surface and/or height changes of the adjustable paving machine 100 and help maintain a seal to confine a paving material in the containment basin 132. The control element 114 may also serve to confine a paving material within the containment basin 132. In some implementations, the forward finishing element 130 and/or the leading sealing element 526 may not be supplied, such that a paving material may easily enter the containment basin 132 as the adjustable paving machine 100 moves over a paving surface on which a paving material has been or is being applied.

With continued reference to FIG. 5, a rotary actuator 530 may be supplied, operative to move the variably expandable portion 104 to different positions. The rotary actuator 530 may be motor, such as a hydraulic, pneumatic, mechanical actuator, or electric motor, or the like. The variably expandable portion 104 may include one or more linear actuators such as the linear actuator 534 and/or the linear actuator 540. A linear actuator may be a device that converts rotary motion into a linear translation, such as a lead screw. Other linear actuators such as hydraulic, pneumatic, or electric pistons or solenoids may be provided. Actuator clearance aperture 518 and 520 may allow a portion of the linear actuator 534 or 540, respectively, to pass therethrough.

An actuator, such as a rotary actuator 530, may be powered by a power source on the adjustable paving machine 100, or by a remote power source. For example, the adjustable paving machine 100 may include a generator, motor, battery, solar panel, hydraulic pump, air compressor, or the like to supply power to an actuator. In other examples, a vehicle may tow the adjustable paving machine 100 and may supply power to the adjustable paving machine 100 such as via a hydraulic or pneumatic conduit, an electrical cable, or the like.

One or more rotating guide members or discs may be included with variably expandable portion 104. For example, a rotating guide member 550, a rotating guide member 552, a rotating guide member 536, and/or a rotating guide member 538 may be supplied. A rotating guide member 550, 552, 536, 538 may be any suitable member that can transmit rotational motion and/or force between itself and another guide member or a flexible element 506. For example, a rotating guide member 550, 552, 536, 538 may be a gear, sprocket, drum, pulley, roller, wheel, or the like. A flexible element 506 is provided as a continuous or closed loop around a plurality of corresponding rotating guide members or discs to define the respective closed-loop path. The term flexible, when describing a flexible element, means that the flexible element is bendable such as to enable it to route or wrap around a rotating guide member. As such, the flexible element may be used to transmit force in tension, for example to transmit the rotation of one guide member to the next, without transmitting force in compression. A flexible element 506 may be provided as a chain, roller chain, belt, gear belt, toothed belt, or the like.

Figure 6:
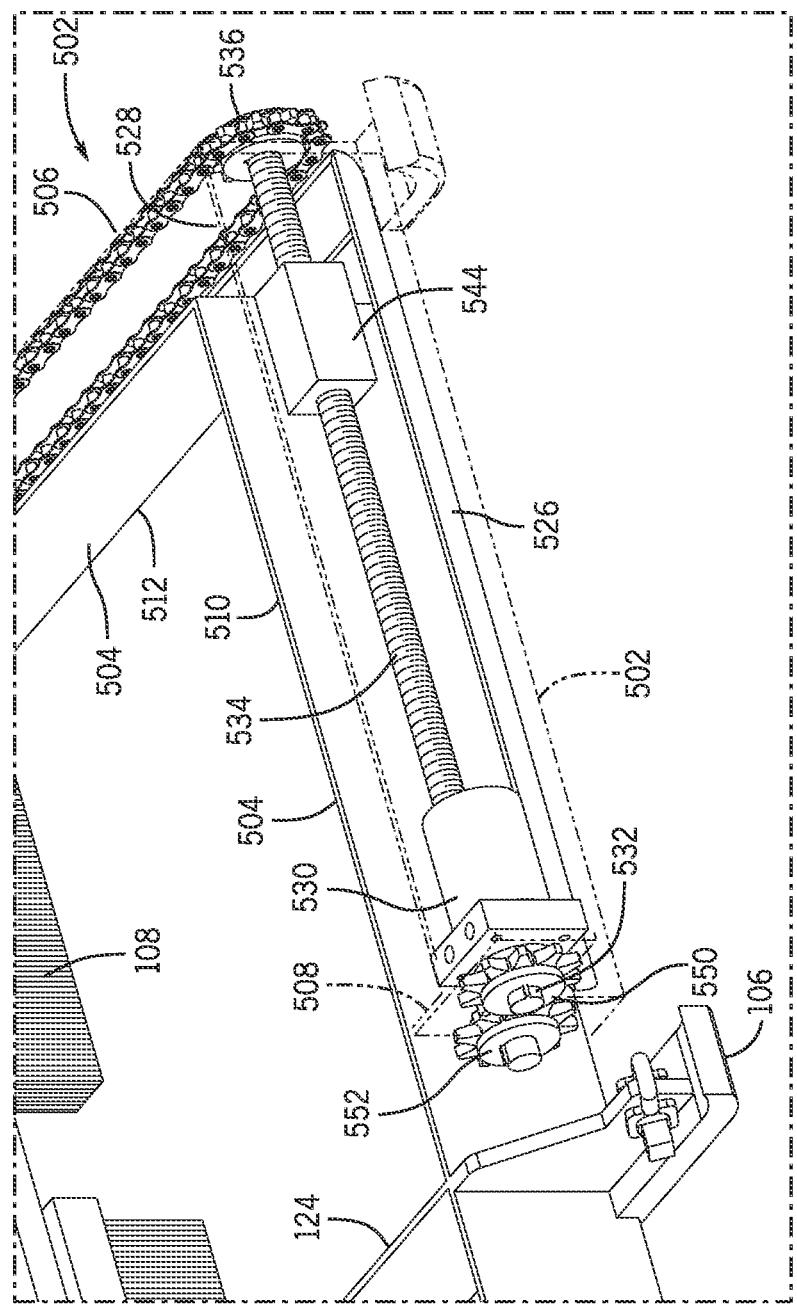
FIG. 6 is a detailed isometric view of part of an expandable portion of the paving machine of FIG. 1 with the movable frame and actuator mount removed.
Figure 7:
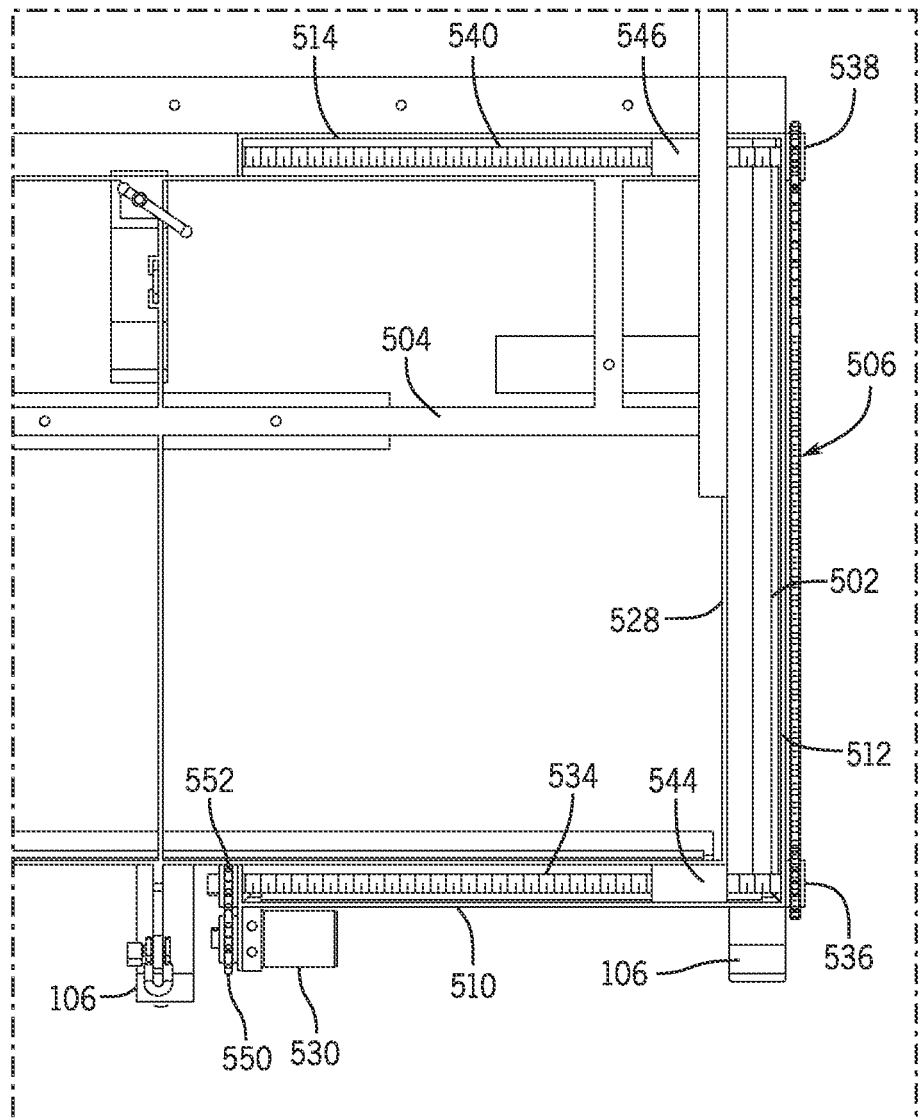
FIG. 7 is a partial plan view of a portion of the paving machine of FIG. 1.

As shown in FIG. 6 and FIG. 7, in an assembled variably expandable portion 104, the rotary actuator 530 may be mounted to the actuator mount 508. Certain features of the variably expandable portion 104 shown in FIG. 6 and FIG. 7, such as the actuator mount 508, are removed or shown in phantom lines for clarity of illustration. Any of the shafts, linear actuators, rotary actuators, or rotating guide members may be attached to one another via a spline, key and keyway, channel guide, tube guide, cylinder guide, or other suitable coupling. For example, a shaft 532 may be coupled to the actuator mount 508 (such as by a key and keyway, spline, coupling or the like). The shaft 532 may be coupled to the rotating guide member 550, similarly with a spline, keyway, coupling or the like. The rotating guide member 550 may be in contact or associated with the rotating guide member 552. For example, the rotating guide member 550 and the rotating guide member 552 may have complementary sets of meshing gear teeth, such as involute teeth, operative to transmit torque and rotation from the rotating guide member 550 to the rotating guide member 552. The rotating guide member 552 may be coupled to a portion (such as an end) of the linear actuator 534. Rotating guide member 536 may be coupled to another portion of the linear actuator 534, such as an end opposite the coupling to the rotating guide member 552. Either or both of the rotating guide member 552 and/or 536 may be coupled to the linear actuator 534 by a keyway, spline, coupling or other suitable structure. The rotating guide member 536 may be a sprocket, such as a sprocket adapted to cooperate with a flexible element 506 like a roller chain. In other examples, the rotating guide member 536 may be a V-pulley, a gear pulley, a drum, or the like and the flexible element 506 may be a complementary belt, chain or other suitable element. The rotating guide member 538 may be a similar member to the rotating guide member 536, such as a sprocket, and may be adapted to cooperate with a suitable flexible element 506 like a roller chain. The rotating guide member 538 may be coupled to a portion of the linear actuator 540, such as an end, again via a spline, keyway, coupling, channel guide, tube guide, cylinder guide, or the like.

The linear actuator 534 may be received in the actuator active aperture 522 and the linear actuator 540 may be received in the actuator active aperture 524. The respective linear actuators may include features such as threads on an outer surface that cooperate with complementary features such as threads of the respective active apertures. The complementary threads of the respective linear actuators and active apertures may cooperate such that when a respective linear actuator is rotated, the linear actuator moves laterally relative to the stationary frame 504. Thus, the linear actuator 534 and the linear actuator 540 may move the movable frame 502 laterally relative to the stationary frame 504 and change the effective width of the adjustable paving machine 100. Thus, rotational motion of the linear actuator 534 may cause the linear actuator thrust member 544 to generate a thrust to move a portion of the variably expandable portion 104 such as the movable frame 502 laterally relative to the first frame portion 124. Similarly, the rotational motion of the linear actuator 540 may cause the linear actuator thrust member 546 to generate a thrust to move a portion of the variably expandable portion 104 such as the movable frame 502 laterally relative to the first frame portion 124.

For example, the rotary actuator 530 may receive a signal (e.g., an electrical signal, a flow of hydraulic fluid, or a flow of air) that causes the rotary actuator 530 to turn. As the rotary actuator 530 rotates, it rotates the shaft 532. The shaft 532 rotates the rotating guide member 550, which rotates the rotating guide member 552. The rotating guide member 552, in turn, rotates the linear actuator 534. The linear actuator 534 rotates the rotating guide member 536. The rotating guide member 536 causes the flexible element 506 to move along its closed loop path and rotates the rotating guide member 538, which rotates the linear actuator 540. As the linear actuator 534 and the linear actuator 540 rotate within the actuator active aperture 522 and linear actuator 540, respectively, the linear actuators apply a lateral force to the actuator mount 508 and the actuator mount 516, respectively, and cause the movable frame 502 to move laterally with respect to the stationary frame 504. As the actuator mount 508 turns in a first direction, the movable frame 502 may move outward laterally with respect to the stationary frame 504 and as the actuator mount 508 turns in a second direction opposite the first direction, the movable frame 502 may move laterally inward relative to the stationary frame 504. Thus, the width of the adjustable paving machine 100 may be variably adjusted. The position of the variably expandable portion 104 may be continuously variable (e.g., as opposed to discretely variable such as the discretely expandable portion 120).

The configuration of the variably expandable portion 104 may be controllable from a remote control. For example, a switch, dial, variable resistor, digital control or other suitable controller may be provided that controls the signal to the rotary actuator 530. In some implementations, the controller may be located in an operator compartment of a vehicle towing the adjustable paving machine 100. In some implementations, the controller may be provided on a pendant associated with the adjustable paving machine 100. In some implementations, the configuration of the variably expandable portion 104 may be set manually. A remote control may communicate to the adjustable paving machine 100 via wired or wireless connections. For example, the remote control may include one or more discrete wired connections that operate a rotary actuator 530, linear actuator 534, 540, a lift mechanism, or dolly mechanism. In other implementations, the remote control may communicate with the adjustable paving machine 100 via a network such as an Ethernet network, a Controller Area Network (CAN), or other suitable network such that the remote control may send commands to the adjustable paving machine 100 and may optionally receive sensor readings (e.g., width, motor torque, etc.) back from the adjustable paving machine 100. In some implementations, the remote control may communicate with the adjustable paving machine 100 via a wireless network such as Wi-Fi, Bluetooth, Zigbee, Wi-Max, or other suitable wireless technology operative to send commands to, and optionally receive information from, an adjustable paving machine 100.

In some implementations, the adjustable paving machine 100 may be controlled automatically, such as by a smart paving controller. For example, the remote control may be configured to receive signals indicating a position of the adjustable paving machine 100 on the Earth, such as latitude, longitude, and/or elevation signals as may be provided by a global navigation satellite system (e.g., the U.S. Global Positioning System (GPS), the Russian GLONASS, and/or the European Galileo systems). The remote control may compare the position of the adjustable paving machine 100 to a desired paving location and may automatically raise, lower, extend, and/or retract portions of the adjustable paving machine 100 such as a variably expandable portion 104 and/or a discretely expandable portion 120 to achieve a desired paving result.

The guide members, actuators (linear and rotary), and the flexible element 506 may synchronize the motion of the movable frame 502 relative to the stationary frame 504 such that the two frames do not become skewed or bound relative to one another. The guide members, actuators (linear and rotary), and the flexible element 506 may synchronize the lateral motion relative to the first frame portion 124 or the second frame portion 102, of a portion of the movable frame 502 proximate the linear actuator thrust member 544 with a portion of the movable frame 502 proximate the linear actuator thrust member 546. For example, the threads of the linear actuator 534 and linear actuator 540 may be selected to correspond to teeth of the rotating guide member 536 and rotating guide member 538 such that the rotary motion of the rotating guide member 536 and the rotary and linear motion of the linear actuator 534 relative to the linear actuator thrust member 544 are synchronized with the rotary motion of the rotating guide member 538 and the rotary and linear motion of the linear actuator 540 relative to the linear actuator thrust member 546 such that the movable frame 502 remains substantially aligned with the stationary frame 504 as the movable frame 502 moves with respect to the stationary frame 504.

The size of the containment basin 132 may change as the variably expandable portion 104 is moved to different configurations. For example, as a variably expandable portion 104 is positioned in an expanded configuration, the containment basin 132 may become wider. Likewise, as a variably expandable portion 104 is retracted, the containment basin 132 may become narrower.

Figure 8A:
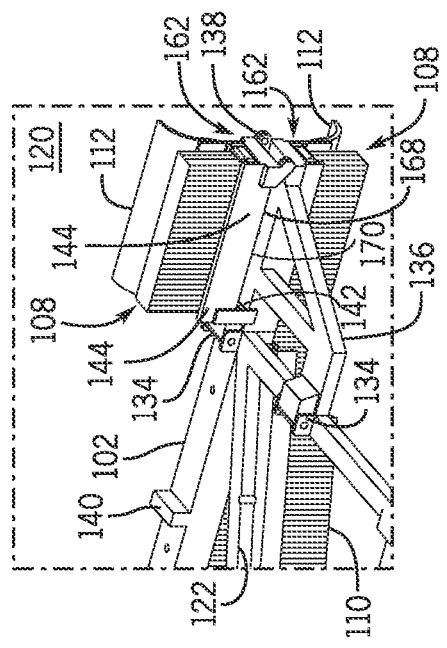
FIG. 8A is a detailed view of a portion of the paving machine of FIG. 1 in a first configuration.
Figure 8B:
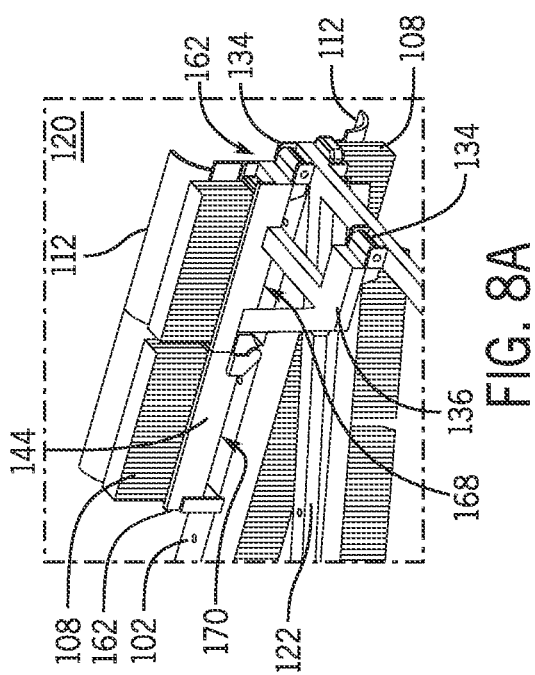
FIG. 8B is a detailed view of a portion of the paving machine of FIG. 1 in a second configuration.
Figure 8C:
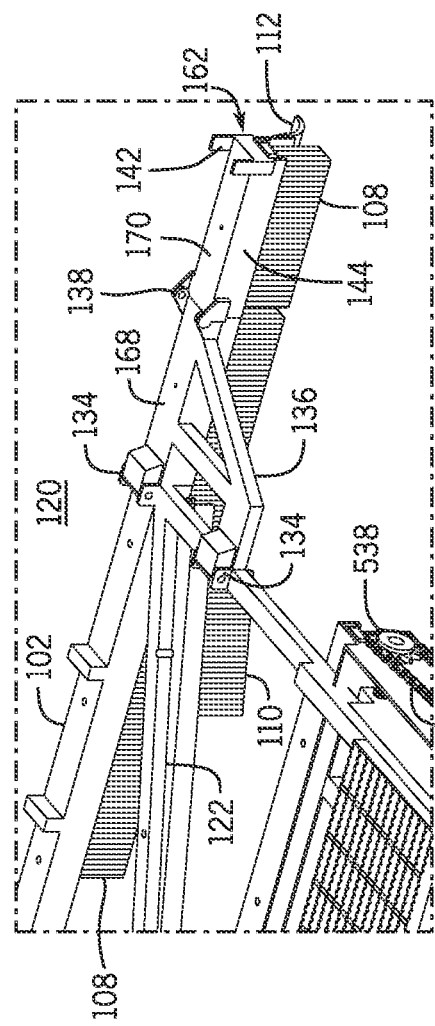
FIG. 8C is a detailed view of a portion of the paving machine of FIG. 1 in a third configuration.

The adjustable paving machine 100 may include one or more discretely expandable portions 120, as shown for example in FIG. 8A-FIG. 8C. The discretely expandable portions 120 may include one or more spreading elements 108 and/or one or more finishing elements 112, or portions thereof. The discretely expandable portion 120 may include a primary frame 136 with a spreading element support 162 that supports a spreading element 108 and/or finishing element 112. The primary frame 136 may be pivotable relative to another portion of the adjustable paving machine 100 about one or more primary pivots 134. For example, a primary frame 136 may pivot relative to the second frame portion 102 about a primary pivot 134. The primary frame 136 may contact or rest on the strut 122 and may pivot relative thereto. When more than one primary pivot 134 is used, the primary pivots 134 may have pivot axes aligned with one another. One or more secondary frames 144 may be pivotable about the primary frame 136, or about other secondary frames 144, about one or more secondary pivots 138. The primary frame 136 may have an upper surface 168 and the secondary frame 144 may have an upper surface 170. Each of the primary frame 136 and secondary frame 144 may be associated with, or have attached thereto, a spreading element 108 and/or a finishing element 112, or portions thereof. In some embodiments, the primary pivots 134 and/or the secondary pivots 138 may be aligned with the longitudinal direction of the adjustable paving machine 100, for example, as shown in FIG. 8A-FIG. 8C. In other examples, the primary pivots 134 and/or the secondary pivots 138 may be disposed at an angle relative to either the longitudinal or lateral directions. Either of the primary frame 136 and/or the secondary frame 144 may include a first securement portion 140 and a second securement portion 142. The first securement portion 140 may be releasably couplable to the second securement portion 142. For example, the first securement portion 140 may be provided as a protrusion rising from, such as perpendicular to, the second frame portion 102. The second securement portion 142 may be provided as a pair of fingers that snugly fit over the protrusion (e.g., a slight interference fit) such that the fingers grasp the protrusion, yet can be released by a user of normal strength pulling the first frame portion 124 or the second frame portion 102 away from the first securement portion 140. Other suitable securement portions may be used, including nuts, bolts, straps, or other fasteners.

As shown for example in FIG. 8A, the discretely expandable portion 120 is shown in a folded or storage configuration. In this configuration, the spreading element 108 and finishing element 112 attached to the first frame portion 124 and the second frame portion 102 are not in contact with the road surface and the effective width of the adjustable paving machine 100 is reduced compared to extended configurations shown in FIGS. 8B and 8C. The upper surface 168 of the primary frame 136 and the upper surface 170 secondary frame 144 may be in contact with, or in proximity to, the secondary frame portion 102 when the discretely expandable portion 120 is in a folded configuration (see FIG. 8A).

As shown for example in FIG. 8B, the primary frame 136 is pivoted relative to the second frame portion 102 about the primary pivot 134 to a first use or partially folded configuration, such that the spreading element 108 and finishing element 112 associated with the primary frame 136 are in contact with the road surface and not in contact with the second frame portion 102 or the strut 122. The effective width of the adjustable paving machine 100 is increased, compared to the width of the folded or storage configuration illustrated in FIG. 8A, by the width of the spreading element 108 and finishing element 112 associated with the primary frame 136. In this configuration, the secondary frame 144 is pivoted relative to the primary frame 136 about the secondary pivot 138 such that the spreading element 108 and the finishing element 112 associated with the secondary frame 144 are in a folded or storage configuration and are not in contact with the road surface. The upper surface 168 of the primary frame 136 and the upper surface 170 secondary frame 144 may be in contact with, or in proximity to, one another when the discretely expandable portion 120 is in a partially folded configuration (see FIG. 8B).

As shown for example in FIG. 8C, the secondary frame 144 is pivoted relative to the primary frame 136 about the secondary pivot 138, to a second use or extended configuration. Similarly to FIG. 8B, the primary frame 136 is pivoted relative to the second frame portion 102 to a use configuration. The upper surface 168 of the primary frame 136 and the upper surface 170 secondary frame 144 may not be in contact with, or in proximity to, one another when the discretely expandable portion 120 is in an extended configuration (see FIG. 8C). In this configuration, the effective width of the adjustable paving machine 100 is increased, compared to the width of the folded or storage configuration illustrated in FIG. 8A, by the size of the spreading elements 108 and finishing elements 112 associated with both the primary frame 136 and the secondary frame 144. In some implementations, a discretely expandable portion 120 may include an actuator operative to remotely or automatically configure the discretely expandable portion 120 between different configurations such as shown for example in FIGS. 8A-8C.

In some implementations, the adjustable paving machine may include a trailing variably expandable portion in addition to, or in lieu of, a discretely expandable portion 120. A trailing variably expandable portion may include finishing elements 112 and spreading elements 108 attached thereto. Such a trailing variably expandable portion may have similar structure and may be operated similarly to the variably expandable portion 104. In some implementations, a trailing variably expandable portion may include a rotary actuator and two linear actuators per side like examples of the variably expandable portion 104 disclosed herein. In some implementations, the trailing variably expandable portion may include one linear actuator per side of the adjustable paving machine 100. The variably expandable portion 104 and the trailing variably expandable portion may be operated in unison or separately. For example, the variably expandable portion 104 may be set to one width, while the trailing variably expandable portion may be set to a different width more or less than that of the variably expandable portion 104. In some implementations, the variably expandable portion 104 and the trailing variably expandable portion may be set to the same width.

The variably expanding portion 104 and discretely expandable portion 120 may be independently adjusted relative to one another such that the widths thereof may be the same as or may be different from one another. For example, a variably expanding portion 104 or discretely expandable portion 120 on one part (e.g., left side) of the adjustable paving machine 100 may be independently adjusted to the same or different width relative to a width of a respective variably expanding portion 104 or discretely expandable portion 120 on another part (e.g., right side) of the adjustable paving machine 100. As another example, a variably expanding portion on one part (e.g., left side) of the adjustable paving machine 100 and a discretely expandable portion 120 on the same part (e.g., left side) may be independently adjusted to the same or different width.

Methods of Using Adjustable Paving Machine

Figure 9:
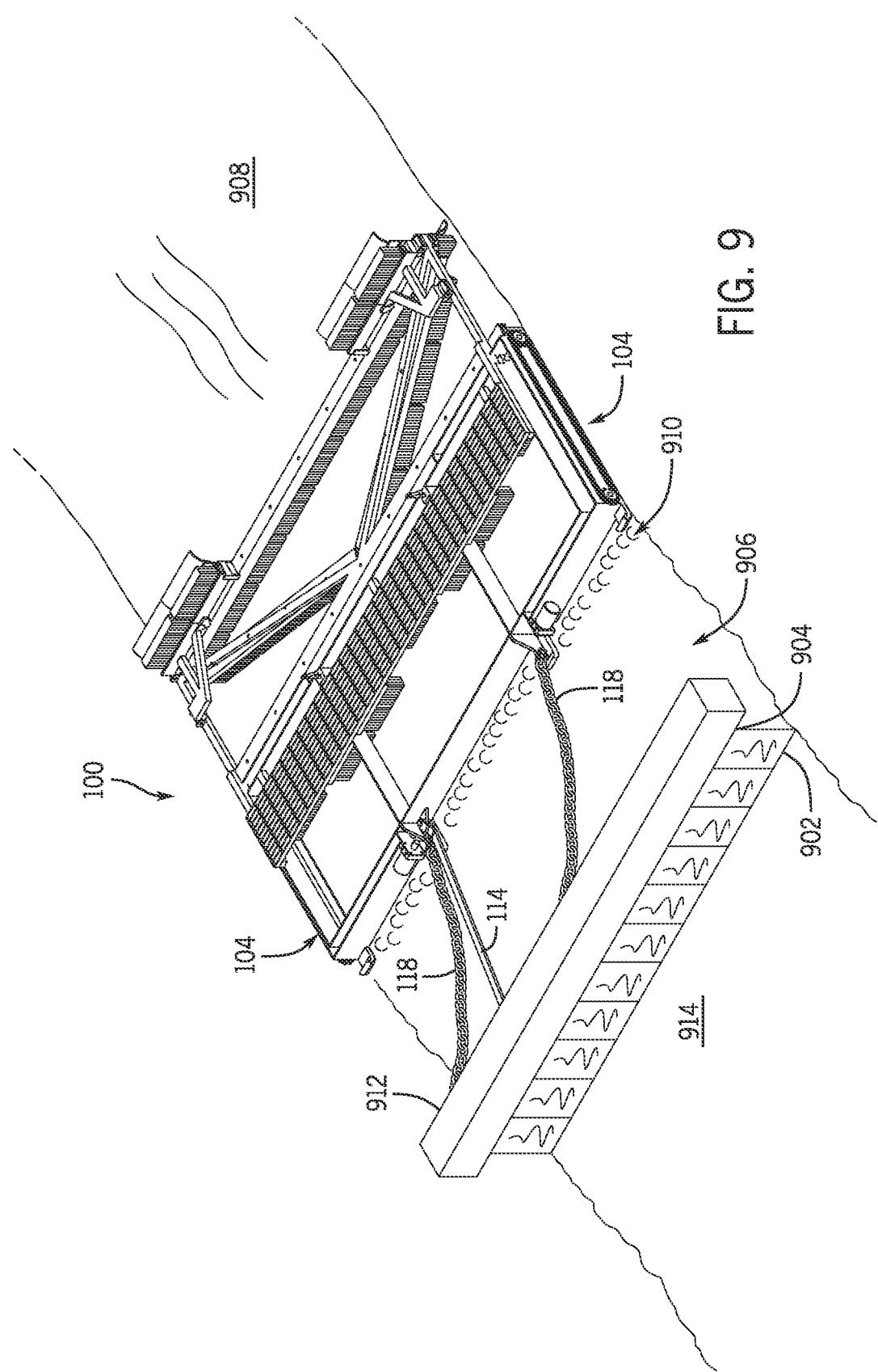
FIG. 9 illustrates an example of a method of using the paving machine of FIG. 1 with a paving material of a first type.

FIG. 9 illustrates an example of an adjustable paving machine 100 in use with a paving material 902. FIG. 9 shows an example of a scrub seal operation. A scrub seal method may be used to repair or seal a paving surface 914 such as when cracks are less than a certain size, for example less than approximately ½ inch in width. A scrub seal may be used in other conditions as well. In this method of use, the paving material 902 may be a relatively less viscous material such as oil or an asphalt emulsion. The adjustable paving machine 100 may be towed behind a vehicle such as an asphalt distributor. The asphalt distributor may be connected to the adjustable paving machine 100 by traction elements 118 and/or control element 114. The distributor includes a spray bar 912 that supports one or more paving material distribution nozzles 904. The paving material distribution nozzles 904 spray the paving material 902 on the paving surface 914 as the distributor passes over the paving surface 914. The spray bar 912 may be located a distance ahead of the adjustable paving machine 100.

The paving material 902 forms a paving material raw layer 906 ahead of the adjustable paving machine 100. As the adjustable paving machine 100 moves over the paving material raw layer 906, a paving material wave 910 may be formed by the adjustable paving machine 100. For example, the forward finishing element 130 (see FIG. 4) and/or the leading sealing element 526 (see FIG. 5 and FIG. 6) may push the paving material 902 forward longitudinally, and begin spreading the paving material 902 laterally. The paving material wave 910 may help assure that sufficient paving material 902 is being applied to adequately cover the paving surface 914. As the adjustable paving machine 100 passes over the paving material raw layer 906, the layer is gradually transformed into a paving material finished layer 908. For example, as the adjustable paving machine 100 passes over the paving material raw layer 906, the successive rows 146, 148, 150, 152, and/or 154 of spreading elements 108, which may include angled spreading elements 110, (see FIG. 1) distribute and spread the paving material 902 across the paving surface 914. A chevron shape, such as formed by the fourth spreading element row 152 and/or an angled spreading element 110 may assist in spreading the paving material 902 laterally, as the angle of the fourth spreading element row 152 may impart lateral force to the paving material 902. The containment basin 132 may help confine the paving material 902 to an area to be paved. For example, the side sealing element 528 (see FIGS. 5-7) may reduce or substantially prevent the leakage of the paving material 902 laterally from the edges of the adjustable paving machine 100. One or more vehicles may follow behind the adjustable paving machine 100 such as to compress the paving material 902, spread aggregate, or perform other steps to finish the paving surface 914.

Figure 10:
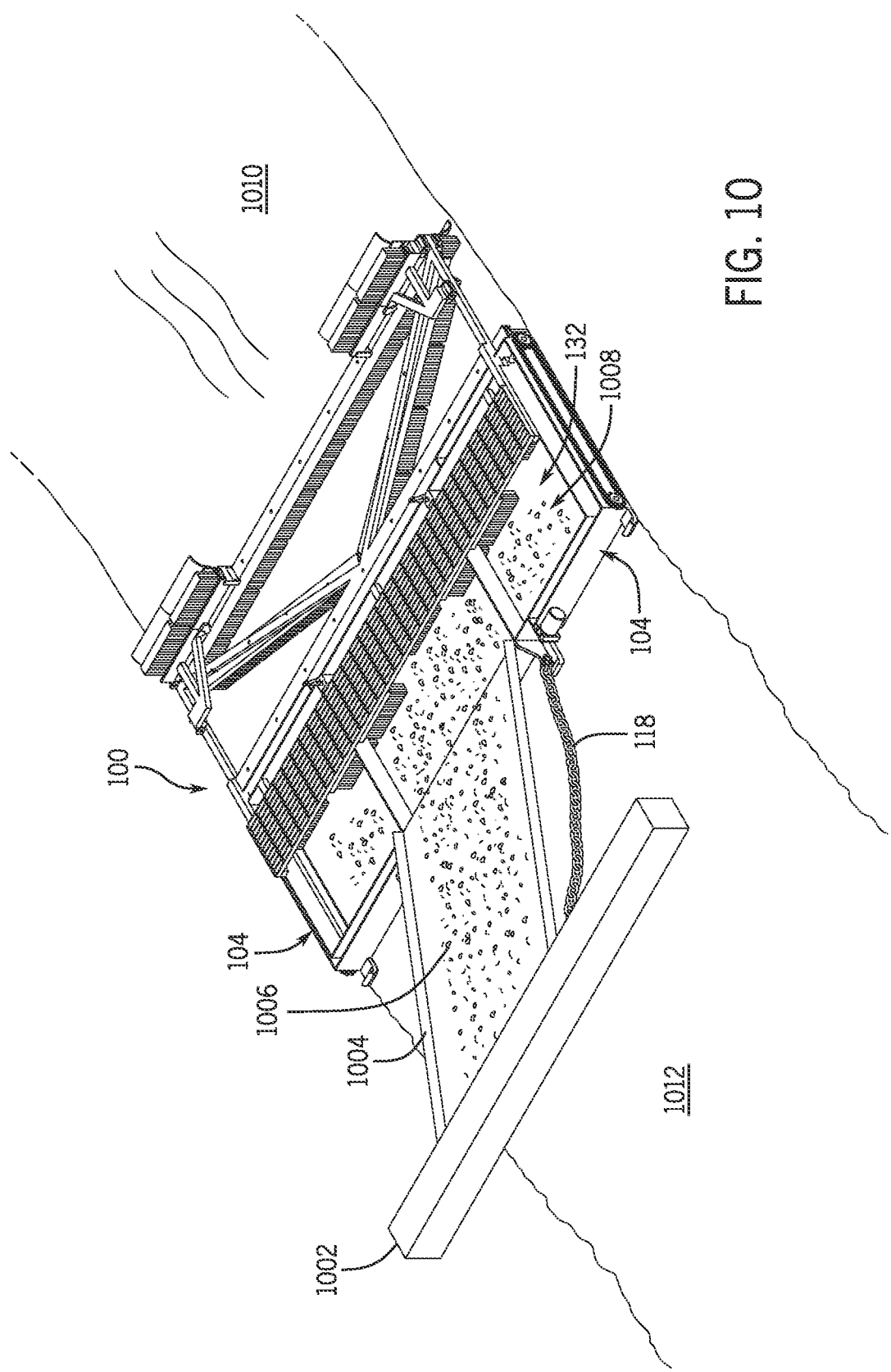
FIG. 10 illustrates an example of a method of using the paving machine of FIG. 1 with a paving material of a second type.

FIG. 10 illustrates an example of an adjustable paving machine 100 in use with a paving material 1006. FIG. 10 shows an example of a slurry seal operation. A slurry seal method may be used to repair or seal a paving surface 1012 such as when cracks are greater than a certain size, for example greater than approximately ¼ inch in width. A slurry seal may be used in other conditions as well. In a slurry seal operation, the paving material 1006 may be a relatively more viscous material than that used in the method illustrated in FIG. 9. For example, the paving material 1006 may be a mixture of aggregate and an emulsion such as to form a slurry. In this method of use, the adjustable paving machine 100 may be pulled behind a vehicle that supplies the paving material 1006. The vehicle may be connected to the adjustable paving machine 100 by traction elements 118. The vehicle may include a paving material dispenser 1004 supported by a paving material dispenser support 1002. The paving material dispenser 1004 may include a chute, trough, or other suitable structure to supply the paving material 1006 to the adjustable paving machine 100. For example, the paving material dispenser 1004 may supply the paving material 1006 to the containment basin 132 of the adjustable paving machine 100. The paving material 1006 may form a paving material raw layer 1008 on the paving surface 1012 in the containment basin 132.

As with the method of use illustrated in FIG. 9, as the adjustable paving machine 100 passes over the paving material raw layer 1008, the layer is gradually transformed into a paving material finished layer 1010. For example, as the adjustable paving machine 100 passes over the paving material raw layer 1008, the successive rows 146, 148, 150, 152, and/or 154 of spreading elements 108 (see FIG. 1) distribute and spread the paving material 1006 across the paving surface 1012. A chevron shape, such as formed by the fourth spreading element row 152 and/or an angled spreading element 110 may assist in spreading the paving material paving material raw layer 1008 laterally, as the angle of the fourth spreading element row 152 may impart lateral force to the paving material raw layer 1008.

The containment basin 132 may help confine the paving material 1006 to an area to be paved. For example, the forward finishing element 130, leading sealing element 526, and/or the side sealing element 528 (see FIGS. 5-7) may confine the paving material 1006 laterally and/or longitudinally. Such containment may provide for more accurate placement of the paving material 1006 on the paving surface 1012. For example, lateral containment may provide for consistent lane edges or edges of the paving surface 1012. Likewise, the containment basin 132 may provide for smooth longitudinal edges of the paving material 1006, such as when the adjustable paving machine 100 reaches the end of the paving surface 1012 and paving is to cease. The containment basin 132 may limit the amount of the paving material 1006 applied past the end of the paving surface 1012.

Figure 3:
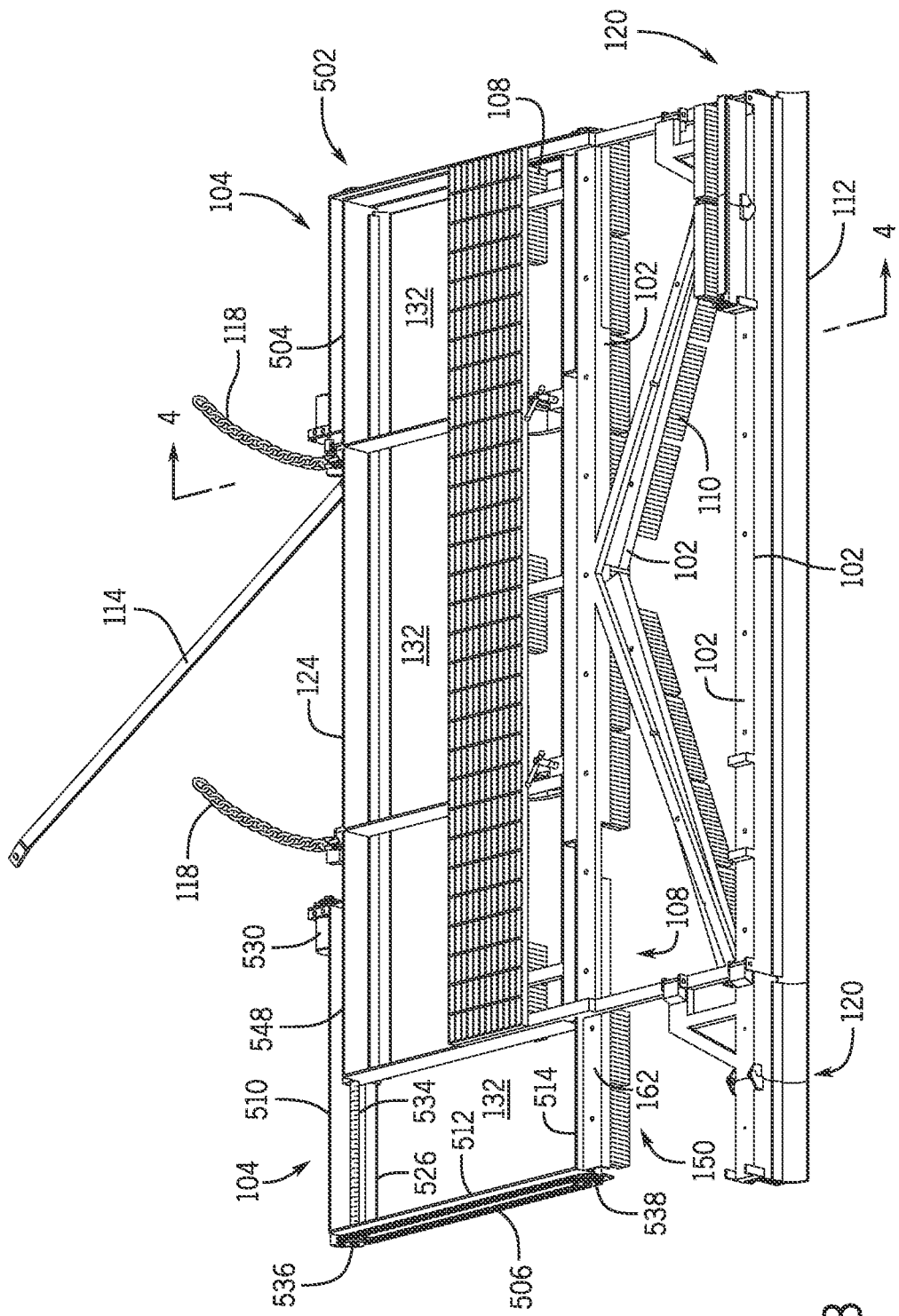
FIG. 3 is a rear, top isometric view of the paving machine of FIG. 1 in a third configuration.

As discussed above with respect to the variably expandable portions 104 and the discretely expandable portions 120, the width of the adjustable paving machine 100 may be varied as desired, such as to adapt to paving surfaces such as the paving surface 914 or the paving surface 1012 of different widths, or the like. The width of the adjustable paving machine 100 may be adjusted symmetrically about a longitudinal midline, or it may be adjusted asymmetrically. For instance, as shown in FIG. 3, the left side of the adjustable paving machine 100 may be expanded to pave a shoulder of a paving surface 914 such as a roadway, while the right side of the adjustable paving machine 100 may be retracted such as to pave one width of a lane adjacent to the shoulder. Such configurations may be advantageous to enable paving operations while leaving lanes open on a roadway for passing traffic.

With reference to FIGS. 11-21, an embodiment of a paving machine 200 is shown. The paving machine is similar to the paving machine 100 in many aspects, which similar aspects are not repeated, for the sake of brevity.

The paving machine 200 includes one or more stationary frames 604 (e.g., left and right stationary frames 604) and one or more moveable frames 602 (e.g., left and right movable frames 602 coupled to the respective left and right stationary frames 604) that, like the movable frames 502 of the paving machine 100, extend laterally from the paving machine in the direction 158. A stationary frame as described herein is not stationary in the sense that it does not move relative to a road surface, or even with respect to a vehicle pulling the paving machine. For example, a stationary frame 504, 604 may be raised or lowered either by a lift mechanism or the adjustable shoes of the paving machine. Rather, a stationary portion is stationary in the sense that it serves as a base or platform against which the moveable frames 502, 602 can extend or retract in the lateral direction as indicated by arrow 158.

The paving machine 200 includes one or more spreading element supports 162 similar to or the same as those of the paving machine 100. The spreading element supports 162 are configured to accept one or more spreading elements 108.

Figure 13:
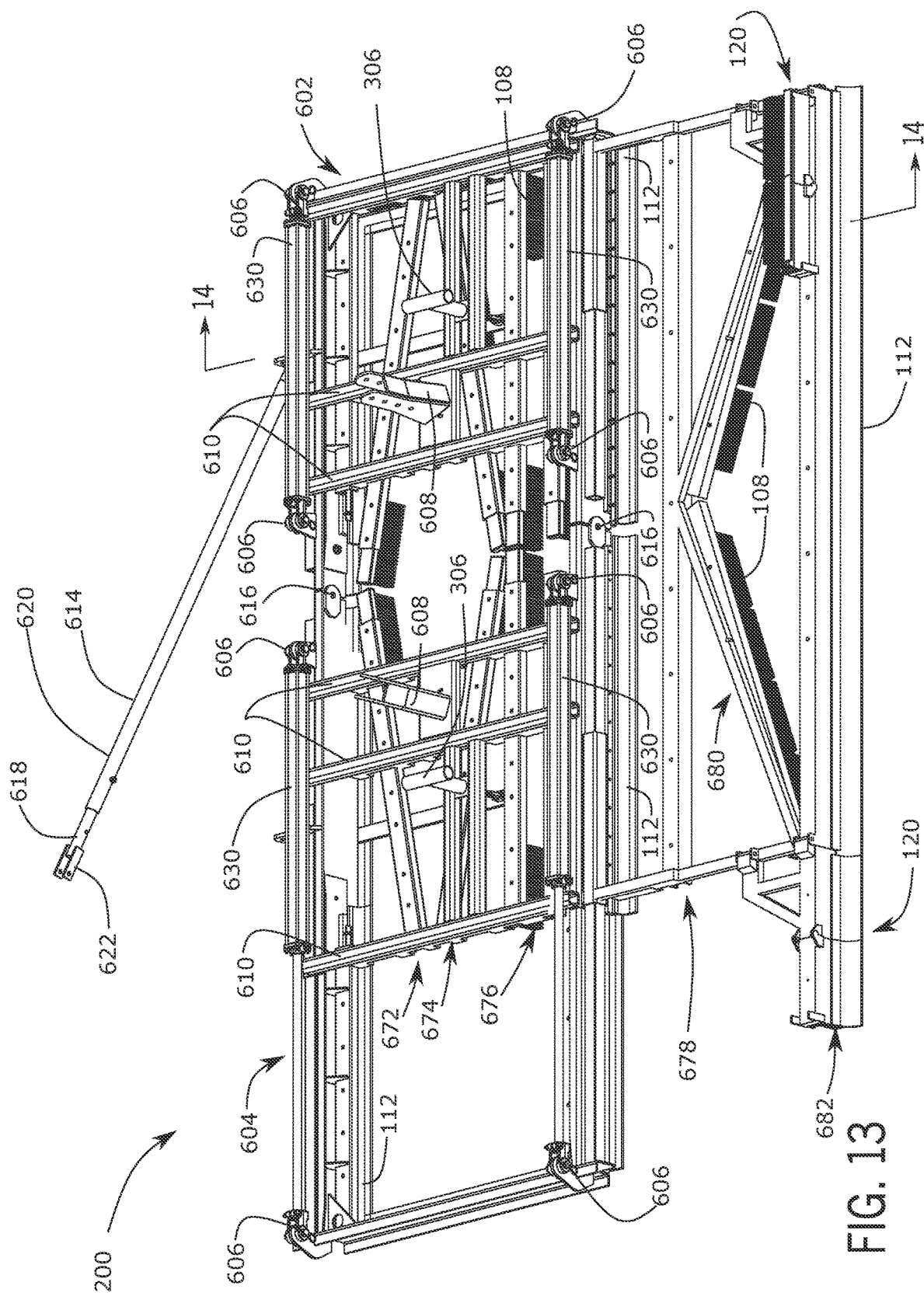
FIG. 13 is a rear, top isometric view of the paving machine of FIG. 11 in a third configuration.
Figure 15:
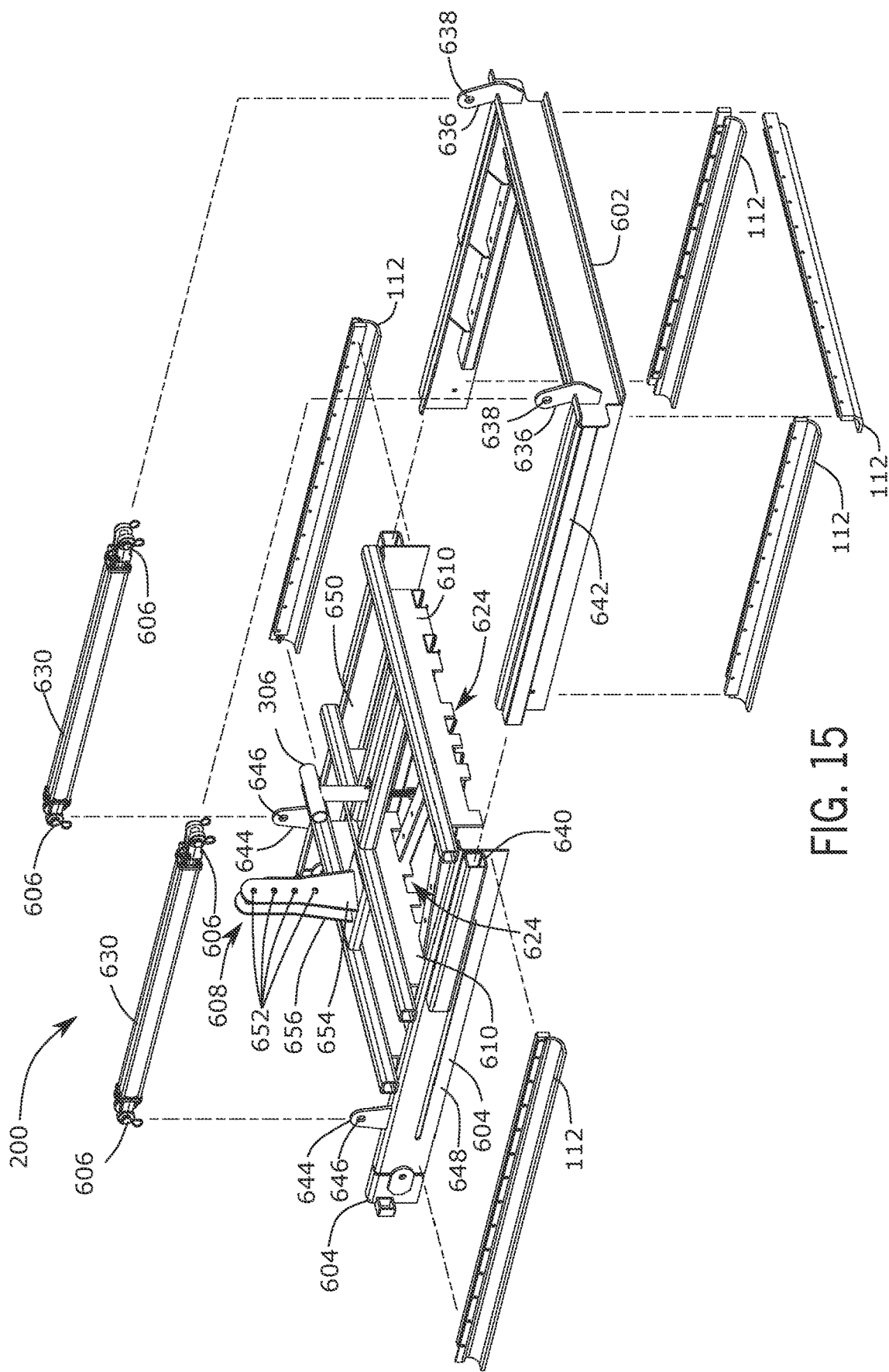
FIG. 15 is an exploded view of a portion of the paving machine of FIG. 11.
Figure 16:
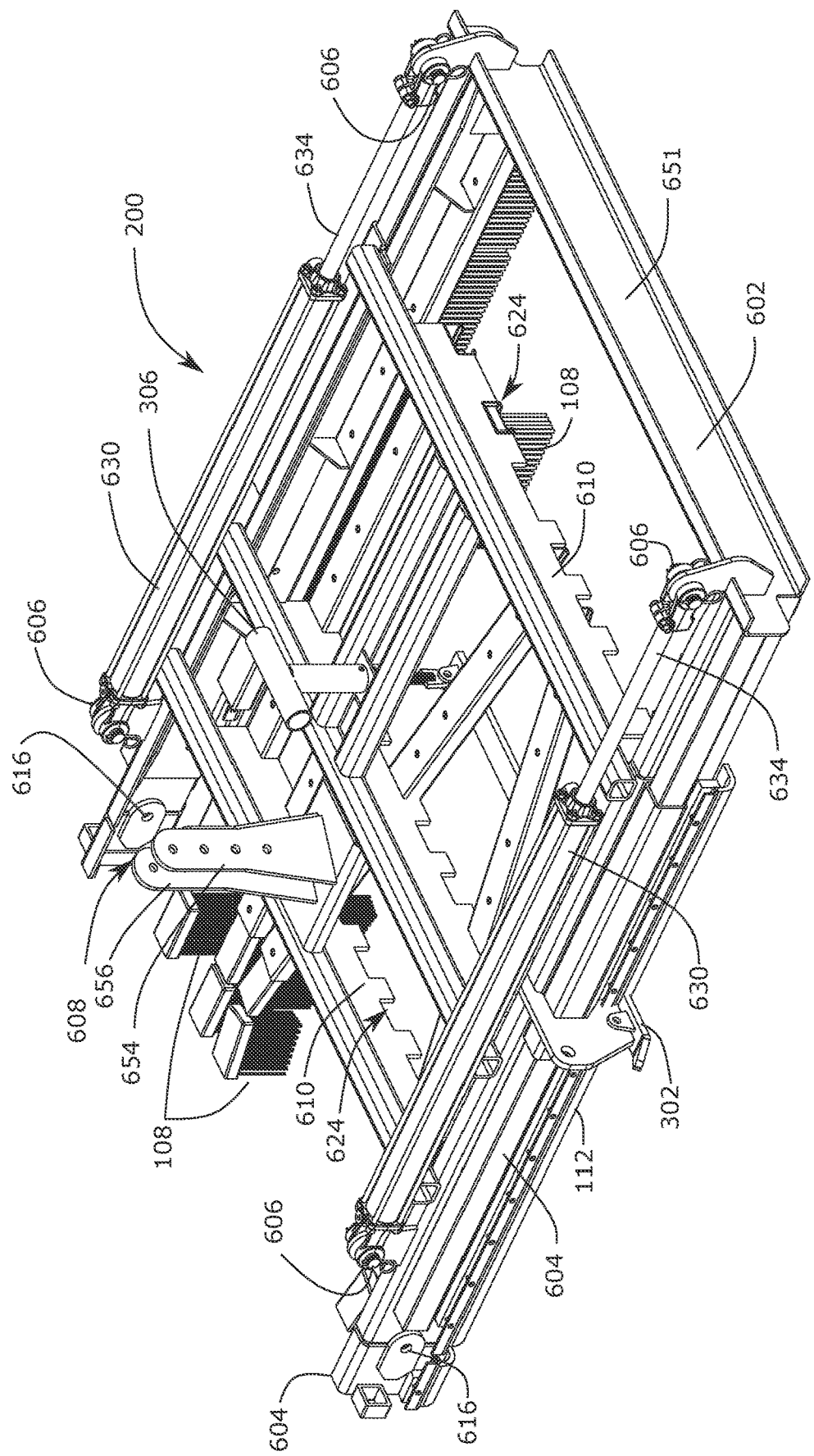
FIG. 16 is a detailed isometric view of part of an expandable portion of the paving machine of FIG. 11.

The paving machine 200 may form a containment basin 132 as previously described. For example, the stationary frame 604 and the moveable frame 602 may have one or more walls (e.g., front wall 648, rear wall 650, and/or side walls 651) that form the containment basin 132 to contain a paving material. The paving machine 200 may have one of more finishing elements 112 disposed along the bottom of a wall that serve to further contain and finish a surface of the paving material. The paving machine 200 may have one or more inner walls 610 oriented in a travel direction 160 of the paving machine. As best seen in FIGS. 15 & 16, the inner walls 610 may include a castellated portion 624 including alternating raised and recessed areas suitable to support the spreading element supports 162. An advantage of the castellated portion 624 may be that the spreading element supports 162 can be placed at different locations and or at angles to the direction of travel 160 so as to achieve a desired spreading or finish of a paving material. As best shown in FIG. 13, the paving machine 200 may include a first spreading element row 672, a second spreading element row 674, a third spreading element row 676, a fourth spreading element row 678, a fifth spreading element row 680, and/or a sixth spreading element row 682 formed by respective spreading element supports 162. Thus the paving machine 200 may be configurable for a wide variety of paving surfaces and/or paving materials.

The paving machine 200 may include a discretely expandable portion 120 similar to, or the same as that of the paving machine 100. The expandable portion 120 may be optionally or selectively attachable to the paving machine 100, 200. For example, FIGS. 15-21 show the machine 200 without the optional expandable portion 120 installed.

Figure 14:
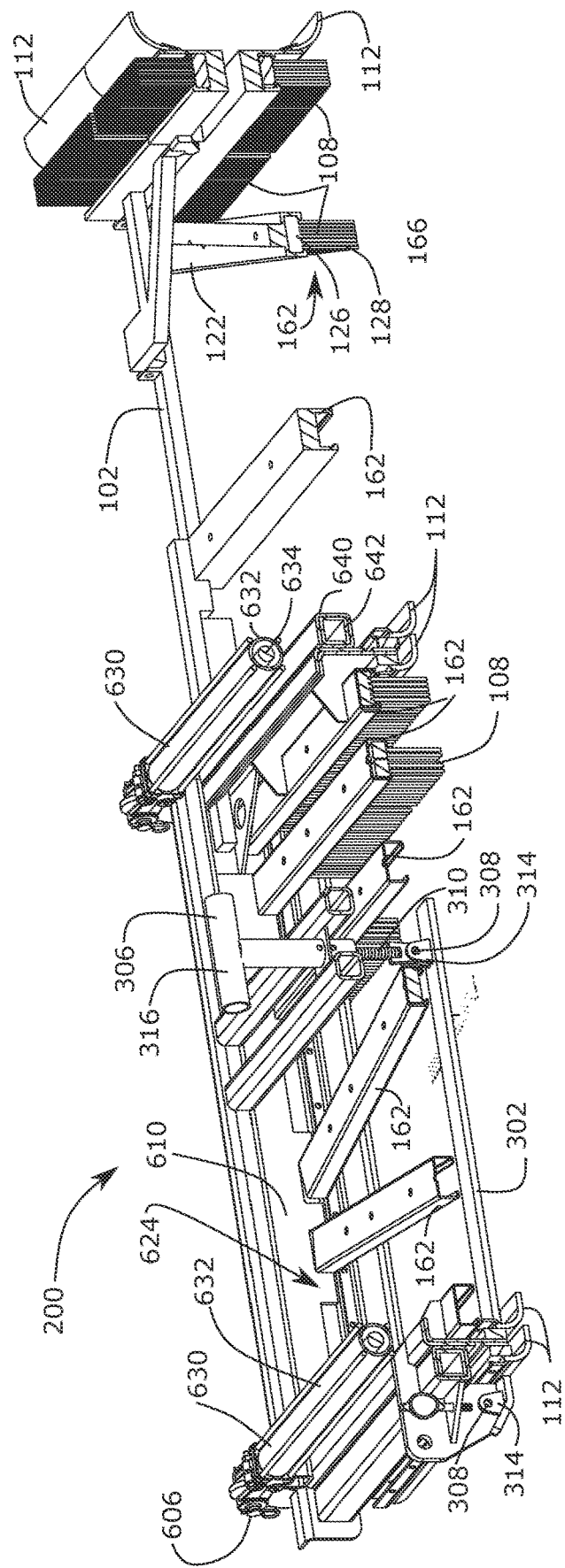
FIG. 14 is a cross section of the paving machine of FIG. 11 taken along section line 14-14 of FIG. 13.
Figure 17:
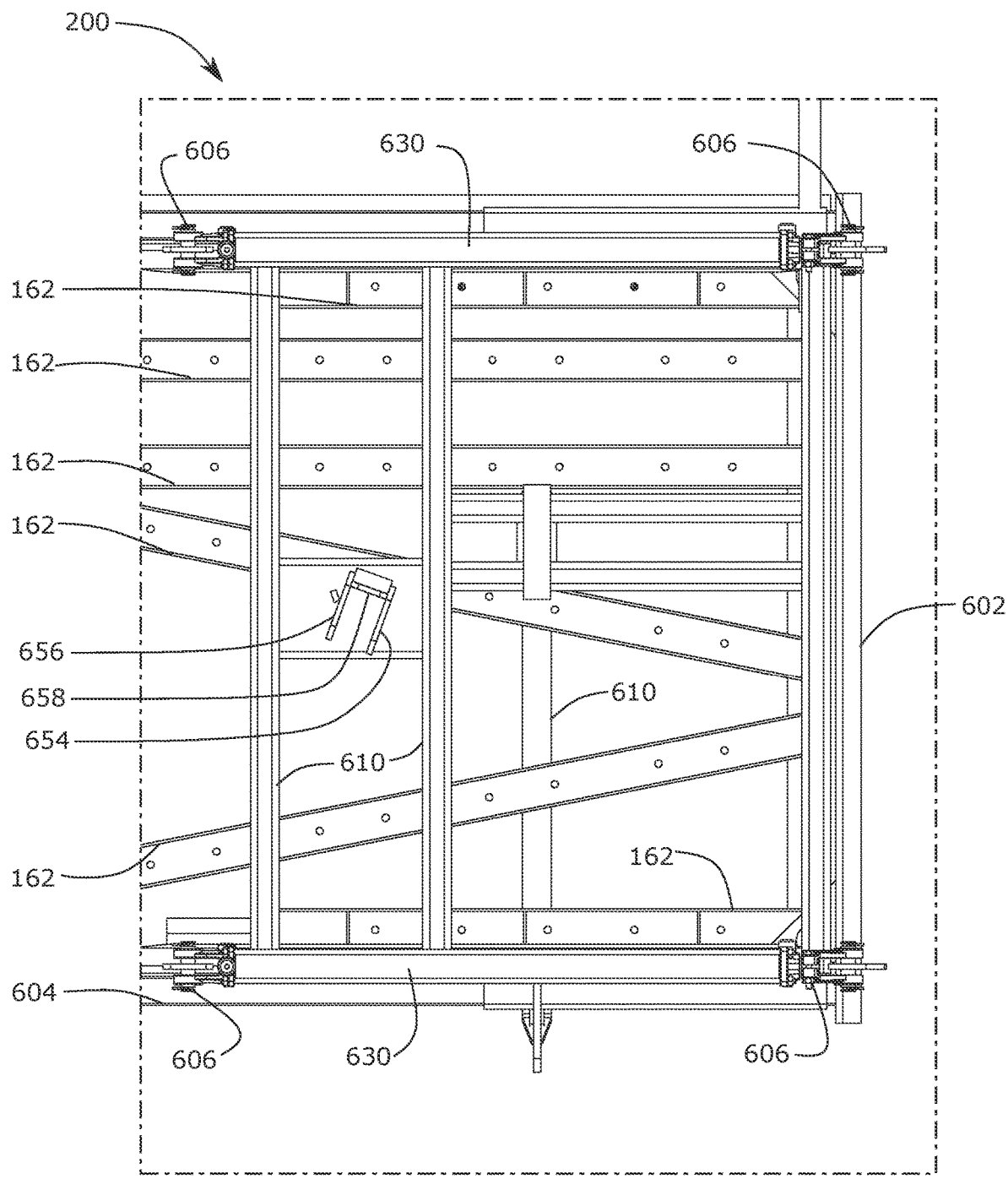
FIG. 17 is a partial plan view of a portion of the paving machine of FIG. 11.

As shown best in FIGS. 15-17, a left portion of the paving machine 200 is shown. The right portion of the paving machine 200 is substantially similar to the left portion. As shown for example in FIG. 15, the stationary frame 604 includes a conduit 640 joined thereto or formed therewith. The moveable frame 602 includes a rail 642 joined thereto or formed therewith. As shown in FIG. 14, the rail 642 is adapted to be slidably received in the conduit 640. Thus the conduit 640 and rail 642 form a guide to direct the extension and retraction of the moveable frame 602 with respect to the stationary frame 604.

As also shown for example in FIG. 15, the stationary frame 604 includes a thrust member 644 including an aperture 646 formed therein and adapted to receive a pin, axle, bolt, shackle, or the like to enable the paving machine 200 to form a portion of a joint 606. Likewise, the moveable frames 602 may include thrust members 636 with apertures 638 adapted to form a portion of a joint 606. The thrust members 644 and 636 are configured to couple to respective ends of actuators 630.

The moveable frames 602 are actuated by one or more linear actuators 630. Respective ends of the linear actuators 630 are coupled to the moveable frames 602 and stationary frames 604 via the thrust members 644 and 636 forming respective joints 606. The linear actuators 630 may be hydraulic or pneumatic piston/cylinder devices where a pressurized working fluid (e.g., oil or air) causes a rod portion 634 to extend and retract relative to a cylinder portion 632. See, e.g., FIG. 11 with the moveable frames 602 retracted, FIG. 12 with the moveable frames extended, and FIG. 13 with one moveable frame 602 extended and another retracted. As is evident in FIG. 13, the moveable frames 602 are moveable independently of one another. A pair or linear actuators 630 may be associated with each moveable frame 602. For example, a first actuator 630 may be disposed at the front of the frame and another actuator at the rear. Such pairs of actuators may provide a benefit of evenly extending or retracting the front and rear portions of the moveable frame 602, such as to prevent skewing or binding of the moveable frame 602 in the stationary frame 604. Thus, the paving machine 200, like the paving machine 100, can adapt to a wide variety of paving widths. The extension or retraction of the moveable frames 602 relative to the stationary frames 604 may be continuously adjusted such that any width of the moveable frame between its fully retracted and fully extended positions may be realized. The actuators 630 may draw hydraulic fluid, air, or another working fluid from a vehicle 900 to which the paving machine 200 is coupled. One or move valves may be used to control the flow of the working fluid to extend, hold in position, and/or retract the moveable frames 602. The valves may be controllable by an operator of the vehicle from the cab, by another person such as with the remote control described herein.

As best shown in FIG. 14, the paving machine 200 may include one or more adjustable shoes 302. The adjustable shoes 302 may serve a similar or the same function as the adjustable shoes 402. The adjustable shoes may have a ski-like structure (e.g., with a raised tip to reduce snagging or gouging the paving surface 914). The adjustable shoes 302 may be coupled to a shoe position adjustment mechanism 306 at any point along the ski structure. A boss 314 may be joined to, or formed with the ski structure. The boss 314 may include an aperture 308 formed therein. The aperture 308 may accept a pin or axle to couple the boss 314 to a screw 310, rotationally coupled to the stationary frame 604 or the moveable frame 602. The screw 310 may be coupled to a handle 316 such as a T-handle, of the shoe position adjustment mechanism 306. An operator may raise or lower the adjustable shoe 302 by turning the handle 316 causing the screw 310 to raise/or lower the shoe 302. Thus, the height of the shoe 302 may be adjusted such as to adapt to different paving surfaces and/or to account for wear of the spreading elements 108.

Figure 18:
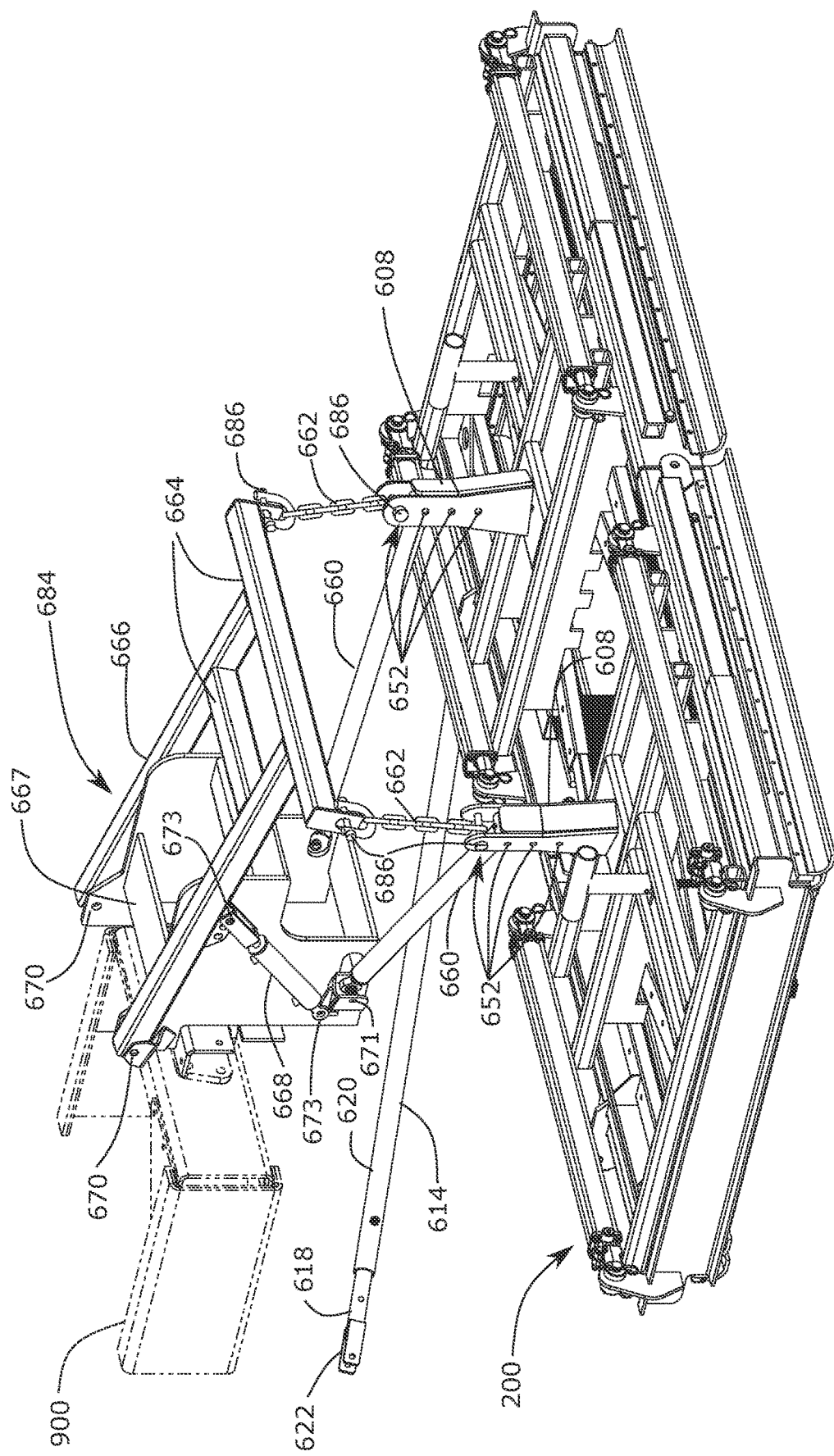
FIG. 18 is an isometric view of the paving a machine of FIG. 11 with a lift mechanism.

As best shown in FIGS. 15-17, the paving machine 200 includes one or more masts 608 joined to the stationary frames 604. The masts 608 enable the stationary frames 604 to be coupled to a lift mechanism 684 (best shown in FIGS. 18-21). The masts 608 may include a first portion 654 and a second portion 656 offset from the first portion by a web portion 658 (seen in FIG. 17). One or more apertures 652 may be formed in either or both of the first portion 654 and second portion 656. The apertures 652 in the first portion 654 may align with the apertures 652 in the second portion 656. As shown in FIG. 18, the apertures 652 in the mast 608 may receive a pin 686, axle, bolt, shackle, or the like to enable the paving machine 200 to be coupled to a lift mechanism 684. The pin 686 may be adjusted to various positions on the mast 608. The masts 608 may be sufficiently strong so as to support the weight of the paving machine 200, such as for raising above the paving surface as described with respect to the lift mechanism, herein.

With reference to FIGS. 18-21, a lift mechanism 684 suitable to liftably couple the paving machine 200 to a vehicle 900 is shown. The lift mechanism 684 includes a frame 666 that is pivotally coupled to a base 667 at joints 670. The base 667 is selectively couplable to a vehicle 900 adapted to pull or tow the paving machine 200. The frame 666 includes one or more cross beams 664 that extend in the lateral direction 158. One or more of the cross beams 664 is couplable to the paving machine 200 by a flexible element 662, such as a chain or belt. The flexible element 662 may couple to the masts 608 on respective left and right stationary frames 604. Rigid elements 660 may jointedly couple the base 667 to the respective masts 608. The rigid elements 660 may be joined to the base at respective joints 671.

Figure 20:
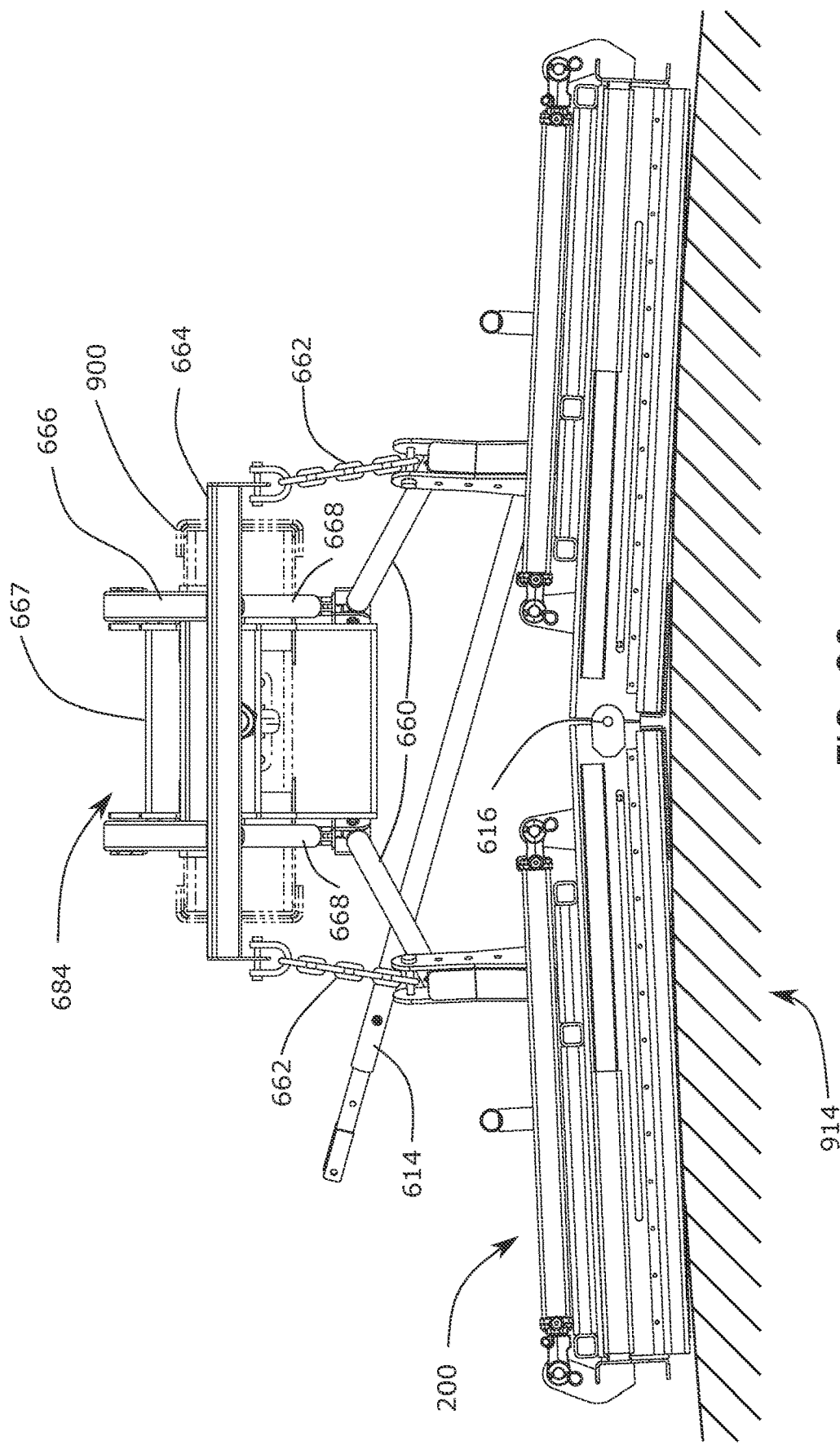
FIG. 20 is a rear elevation view of the paving machine of FIG. 11 with a crowned paving surface.
Figure 21:
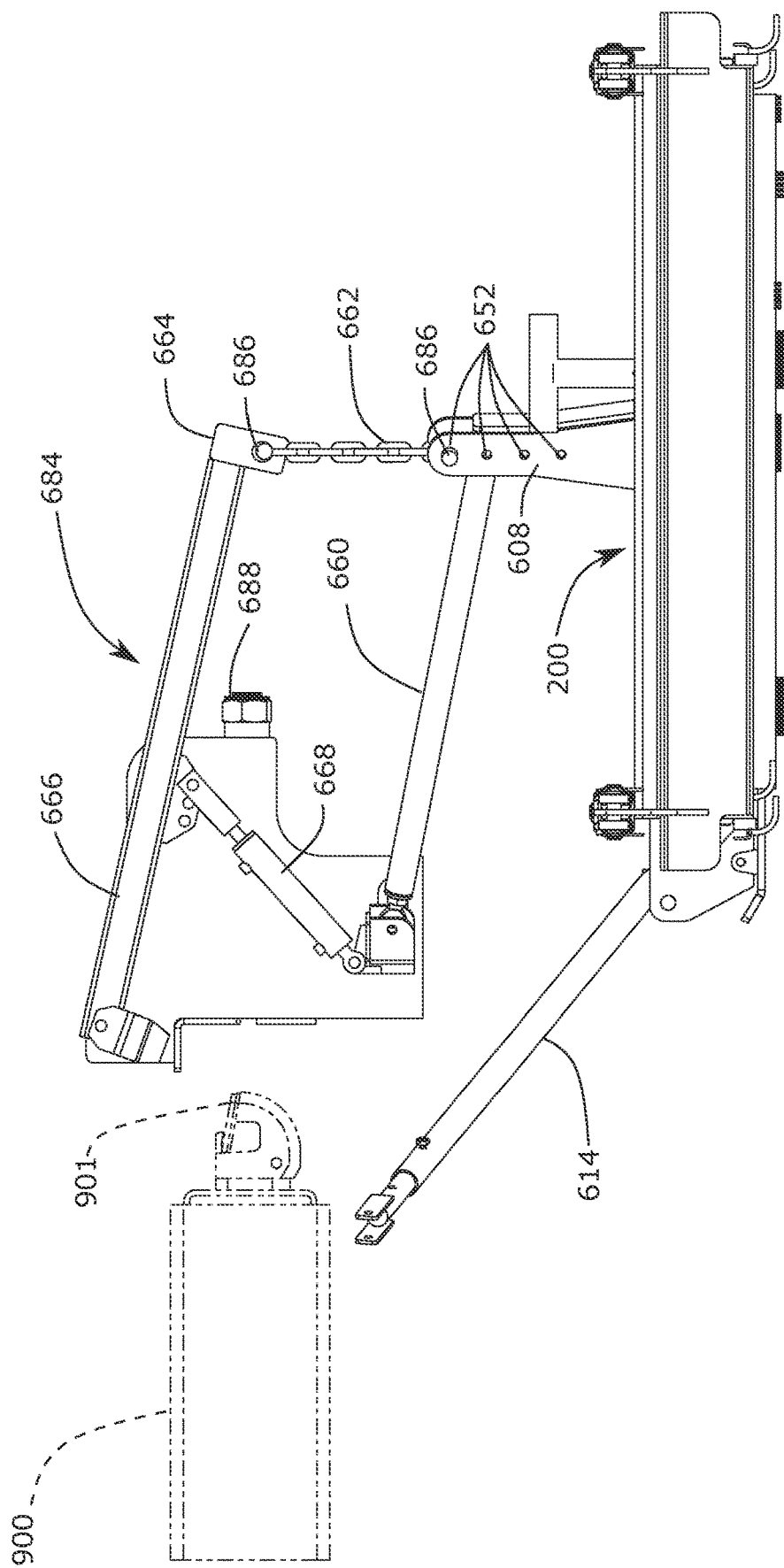
FIG. 21 is a side elevation view of the paving machine of FIG. 11 with the lift mechanism of FIG. 18.

One or more lift actuators 668 may be jointedly coupled between the base 667 and the frame 666 at respective joints 673. The joints 673 may enable the ends of the lift actuators 668 to pivot relative to the base 667 and the frame 666. For example, as shown in FIG. 20, respective left and right lift actuators 668 may be coupled between the base 667 and the frame 666. The lift actuators 668 may be hydraulic and/or pneumatic piston/cylinder devices that linearly extend and contract to raise or lower the paving machine 200 relative to the paving surface 914. As shown for example, in FIG. 21 the frame 666, the flexible elements 662, the rigid elements 660, and the lift actuators 668 may form a pair of four-bar linkages suitable to raise or lower the paving machine 200, while keeping the paving machine 200 substantially level with respect to a paving surface. Also shown for example in FIG. 21, the base 667 includes a coupler mechanism 688 suitable to couple the base 677 to a hitch 901, such as a pintle hitch of the vehicle 900.

Figure 19:
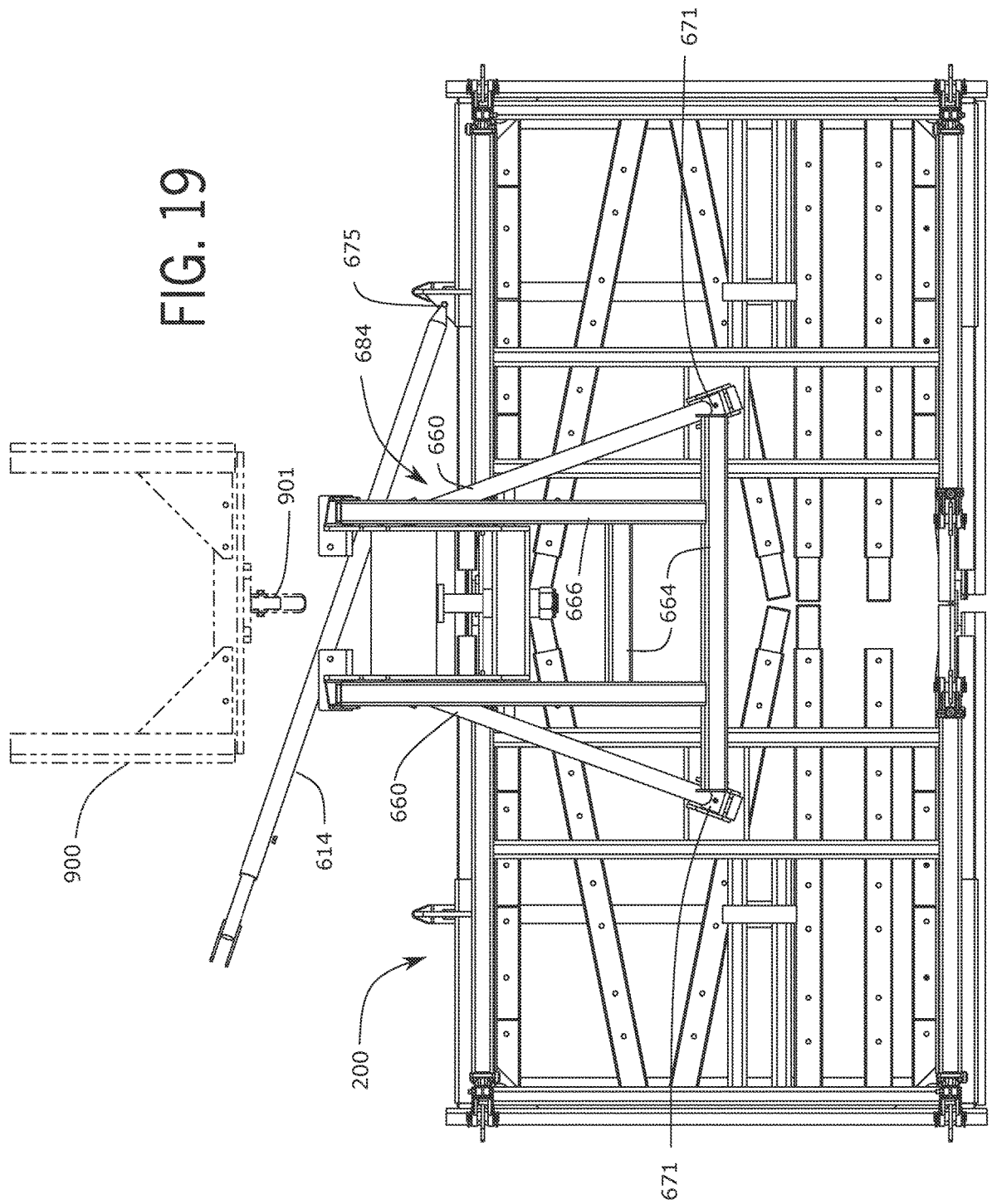
FIG. 19 is a plan view of the paving a machine of FIG. 11 with the lift mechanism of FIG. 18.

As shown in FIGS. 18 & 19, a control element 614 may be coupled to the paving machine 200 and the vehicle 900 to steer the paving machine 200 left or right relative to the vehicle 900. The control element 614 may be a telescoping device with an outer portion 620 that slidably receives an inner portion 618. The inner portion 618 may include a coupler 622 adapted to couple the inner portion 618 to the vehicle 900. The control element may be coupled to the paving machine 200 at a joint 675.

The stationary frames 604 of the paving machine 200 may be movably joined to one another at a joint 616 (best seen in FIGS. 13, 16, and 20). For example, a left stationary frame 604 and a right stationary frame 604 may be pivotally coupled to one another at the joint 616, such that the joint 616 is configured to enable the left and right stationary frames 604 to conform to the paving surface. The joint 616 enables the paving machine 200 to adapt to crowned paving surfaces (as shown for example in FIG. 20), rutted paving surfaces, sloped paving surfaces, or other uneven paving surfaces. For example, the left and right portions of the paving machine 200 may pivot relative to one another about the joint 616 to conform to the paving surface 914.

The foregoing description has broad application. The discussion of any embodiment is meant only to be explanatory and is not intended to suggest that the scope of the disclosure, including the claims, is limited to these examples. In other words, while illustrative embodiments of the disclosure have been described in detail herein, the inventive concepts may be otherwise variously embodied and employed, and the appended claims are intended to be construed to include such variations, except as limited by the prior art.

The foregoing discussion has been presented for purposes of illustration and description and is not intended to limit the disclosure to the form or forms disclosed herein. For example, various features of the disclosure are grouped together in one or more aspects, embodiments, or configurations for the purpose of streamlining the disclosure. However, various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for illustration purposes to aid the reader's understanding of the present disclosure, and do not create limitations, particularly as to the position, orientation, or use. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other, unless so stated. Identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may not be to scale or may vary in other embodiments.

What is claimed is:

1. A paving machine, comprising:
   a plurality of walls forming a containment basin towable behind a vehicle and configured to receive a paving material from the vehicle; and at least one brush located within the containment basin and configured to spread the paving material on a roadway surface.

2. The paving machine of claim 1, wherein the at least one brush includes:
a first row of brushes inside the containment basin and located at a leading side of the containment basin relative to a normal tow direction of the vehicle; and
a second row of brushes that trails behind the first row of brushes.

3. The paving machine of claim 2, wherein:
the first row of brushes includes bristles with a first packing density, a first stiffness, and a first length;
the second row of brushes includes bristles with a second packing density, a second stiffness, and a second length; and
at least one of the second packing density, the second stiffness, or the second length is different than the first packing density, the first stiffness, or the first length, respectively.

4. The paving machine of claim 2, wherein the first row of brushes has a shape that is different than the second row of brushes.

5. The paving machine of claim 4, wherein the first row of brushes is located immediately downstream of a location at which the paving material is received inside of the containment basin.

6. The paving machine of claim 5, wherein the first row of brushes has a V-shape with a central vertex that leads opposing ends of the first row of brushes during towing of the paving machine in the normal tow direction.

7. The paving machine of claim 1, wherein the at least one brush includes a row of brushes inside the containment basin.

8. The paving machine of claim 7, wherein the row of brushes is located at a leading side of the containment basin relative to a normal tow direction of the vehicle.

9. The paving machine of claim 7, wherein the row of brushes has a non-linear shape.

10. The paving machine of claim 9, further including a second row of brushes trailing the row of brushes.

11. The paving machine of claim 10, wherein the second row of brushes has a linear shape.

12. The paving machine of claim 7, wherein the row of brushes has a V-shape with a central vertex that leads opposing ends of the row of brushes during towing of the paving machine in a normal tow direction.

13. The paving machine of claim 12, further including a second row of brushes trailing the row of brushes.

14. The paving machine of claim 13, wherein the second row of brushes has a linear shape.

15. The paving machine of claim 7, wherein the row of brushes is located immediately downstream of a location at which the paving material is received inside of the containment basin.

16. The paving machine of claim 15, wherein the row of brushes has a V-shape with a central vertex that leads opposing ends of the row of brushes during towing of the paving machine in a normal tow direction.

17. The paving machine of claim 16, further including a second row of brushes trailing the row of brushes.

18. The paving machine of claim 17, wherein the second row of brushes has a linear shape.

19. The paving machine of claim 7, further including a second row of brushes sequentially arranged relative to the row of brushes and a normal tow direction of the vehicle.

20. A paving machine, comprising:
a plurality of walls forming a containment basin towable behind a vehicle and configured to receive a paving material from the vehicle;
a first row of brushes located immediately downstream of a location at which the paving material is received inside of the containment basin, the first row of brushes having a linear shape; and
a second row of brushes sequentially arranged relative to the first row of brushes and a normal tow direction of the vehicle, the second row of brushes having a non-linear shape.

* * * * *